(12) United States Patent
Kim et al.

(10) Patent No.: US 7,289,417 B2
(45) Date of Patent: Oct. 30, 2007

(54) LENS CORRECTING WAVEFRONT ERROR CAUSED BY TILT AND OPTICAL PICKUP USING SAME

(75) Inventors: Tae-kyung Kim, Seoul (KR);
Chong-sam Chung, Gyeonggi-do (KR);
Young-man Ahn, Gyeonggi-do (KR);
Jong-bae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 10/653,451

(22) Filed: Sep. 3, 2003

(65) Prior Publication Data
US 2004/0114495 A1    Jun. 17, 2004

(30) Foreign Application Priority Data
Sep. 3, 2002    (KR) .................. 10-2002-0052934

(51) Int. Cl.
*G11B 7/135*    (2006.01)
(52) U.S. Cl. .................................. 369/112.24
(58) Field of Classification Search ............ None
See application file for complete search history.

(56) References Cited

U.S. PATENT DOCUMENTS

| | | | |
|---|---|---|---|
| 5,365,535 A | * 11/1994 | Yamaguchi et al. | 369/121 |
| 5,768,027 A | 6/1998 | Takahashi | |
| 6,172,958 B1 | 1/2001 | Mochizuki et al. | |
| 6,304,526 B1 | * 10/2001 | Nagashima et al. | 369/44.23 |
| 6,314,064 B1 | * 11/2001 | Ueda et al. | 369/44.23 |
| 6,895,593 B2 | * 5/2005 | Kim et al. | 720/669 |

FOREIGN PATENT DOCUMENTS

| | | |
|---|---|---|
| CN | 1196816 | 10/1998 |
| CN | 1350686 | 5/2002 |

(Continued)

OTHER PUBLICATIONS

Office Action issued in Japanese Patent Application No. 2003-311331 on Aug. 1, 2006.

(Continued)

*Primary Examiner*—Andrea Wellington
*Assistant Examiner*—Parul Gupta
(74) *Attorney, Agent, or Firm*—Stein, McEwen & Bui, LLP

(57) ABSTRACT

An optical pickup having a plurality of objective lenses. At least one of the plurality of objective lenses is configured so that a type of wavefront error mainly generated by a tilt of the at least one of the plurality of objective lenses is the same as a type of a wavefront error mainly generated by an angle at which light is incident upon the at least one of the plurality of objective lenses.

72 Claims, 21 Drawing Sheets

FOREIGN PATENT DOCUMENTS

| | | |
|---|---|---|
| EP | 1 178 474 A1 | 2/2002 |
| JP | 08-138265 | 5/1996 |
| JP | 08-315408 | 11/1996 |
| JP | 10-031826 | 2/1998 |
| JP | 11-023960 | 1/1999 |
| JP | 11-259891 | 9/1999 |
| JP | 2000-339740 | 12/2000 |
| JP | 2001-043556 | 2/2001 |
| JP | 2001-249272 | 9/2001 |
| WO | WO 02-27715 | 4/2002 |

OTHER PUBLICATIONS

Preliminary Notice of the First Office Action issued Mar. 13, 2006 by the Taiwan Intellectual Property Office re: Taiwanese Patent Application No. 92124293.

Office Action issued in Chinese Patent Application No. 03147052.1 on Jul. 22, 2005.

Office Action issued by Chinese Patent Office in Chinese Patent Divisional Application No. 200510129426.8 on Apr. 6, 2007.

* cited by examiner

FOCUSING DIRECTION

DIRECTION R

LENS CORRECTING WAVEFRONT ERROR CAUSED BY TILT AND OPTICAL PICKUP USING SAME

CROSS-REFERENCE TO RELATED APPLICATIONS

This application claims the benefit of Korean Patent Application No. 2002-52934, filed Sep. 3, 2002, in the Korea Intellectual Property Office, the disclosure of which is incorporated herein by reference.

BACKGROUND OF THE INVENTION

1. Field of the Invention

The present invention relates to lenses and optical pickups and, more particularly, to a lens which corrects a wavefront error caused by the tilt of the lens itself, an optical pickup using the lens as an objective lens, and a method of correcting a wavefront error.

2. Description of the Related Art

Optical recording and/or reproducing apparatuses can record data on or reproduce the data from an optical disc, which is an optical information storage medium, by using optical spots focused by an objective lens. In the optical recording and/or reproducing apparatuses, the recording capacity depends on the size of an optical spot. The size (S) of an optical spot depends on the wavelength ($\lambda$) of light and the numerical aperture (NA) of an objective lens, as expressed by Equation 1:

$$S \propto \lambda/NA \qquad (1)$$

Accordingly, a short wavelength light source, such as a blue-violet laser, and an objective lens with an NA of 0.6 or greater must be used to reduce the sizes of optical spots focused on an optical disc in order to achieve high-density storage.

If the tilting angle of an optical disc is $\theta$, the refractive index of the optical disc is n, the thickness of the optical disc is d, and the numerical aperture of an objective lens is NA, $W_{31}$, which is a coma aberration caused by the tilt of the optical disc, can be expressed by a relationship expression such as Equation 2:

$$W_{31} = -\frac{d}{2} \frac{n^2(n^2-1)\sin\theta\cos\theta}{(n^2-\sin^2\theta)^{5/2}} NA^3 \qquad (2)$$

The refractive index and thickness of the optical disc denote the refractive index and thickness of an optical medium which ranges from a light incidence surface to a recording surface of the optical disc.

Considering Equation 2, a tilt tolerance with respect to the optical disc can be obtained by reducing the thickness of an optical disc as the numerical aperture of the objective lens is increased to obtain a high-density optical disc. CDs have thicknesses of 1.2 mm, and the thicknesses of digital versatile discs (DVDs) have been reduced to 0.6 mm. Next-generation DVDs, called high definition DVDs (HD-DVDs), are high-density optical information storage media having a recording capacity of 20 GB or greater and highly likely to have thicknesses of 0.1 mm. The high-density optical information storage media are presently being developed and standardization to be able to store information about high-definition moving pictures is contemplated. For CDs, the NA of an objective lens is 0.45. As for DVDs, the NA of an objective lens is 0.6. For next-generation DVDs, the NA of an objective lens is highly likely to be greater than 0.6, for example, to be 0.85. When a next-generation DVD is used, a blue-violet light source which radiates blue-violet light with a wavelength of about 405 nm is highly likely to be adopted in consideration of the recording capacity of the next-generation DVD. Accordingly, when an optical information storage medium of a new standard is developed, compatibility with existing optical information storage media will likely be an important consideration.

For example, since a write-once DVD-R and CD-R among existing optical discs has a reflective index which significantly decreases with respect to some wavelengths, light sources which emit light with a 650 nm wavelength and light with a 780 nm wavelength must be used. Thus, to be compatible with today's DVD-R and/or CD-R, an optical pickup for next-generation DVDs needs to adopt two or three light sources which radiate light beams at different wavelengths.

When such a compatible optical pickup using a plurality of light sources which emit light beams at different wavelengths uses only one objective lens, spherical aberrations due to the difference in light wavelength and the difference in the thickness of an optical disc are generated at the same time. Hence, a correction element, such as, for example, a holographic optical element, must be used to correct the spherical aberration.

For example, if the coefficient of the holographic optical element is optimized so that light with a 405 nm wavelength is diffracted as zeroth-order diffracted light and light with a 650 nm wavelength is diffracted as first-order diffracted light to correct for aspherical aberration, the spherical aberrations caused by the difference in light wavelength and the difference in the thickness of an optical disc can be corrected.

However, as shown in FIG. 1, when a holographic optical element is used to correct spherical aberrations, it is difficult to maintain high optical efficiency.

FIG. 1 shows optical efficiency with respect to the depth of a hologram pattern of a holographic optical element of an 8-step blazed type which is manufactured using silica as a base material. As shown in FIG. 1, if the depth of the hologram pattern is set to obtain zeroth order optical efficiency of 70% or greater in the 405 nm wavelength, the first order optical efficiency in the 650 nm wavelength during reproduction of a DVD is only about 10%.

When an objective lens having a high NA, such as, a 0.85 NA is designed and manufactured as a single lens, an advanced technique is required. In addition, it is difficult to manufacture an objective lens which has a high NA to be suitable for both HD-DVDs and DVDs and/or CDs and also has a long working distance like DVD objective lenses.

It is known that when a blue-violet light source and a 0.1 mm-thick optical disc are used, an objective lens requires a working distance of about 0.6 mm. When DVD light with a 650 nm wavelength and CD light with a 780 nm wavelength are focused by an objective lens with a high NA designed to be suitable for a blue-violet light source and a 0.1 mm-thick optical disc, and accordingly optical spots are formed on the recording surfaces of a DVD and a CD, their working distances are 0.32 mm and −0.03 mm, respectively. In other words, the CD and the objective lens collide with each other.

Thus, an optical pickup that includes at least two objective lenses to be compatible with a next-generation DVD and a DVD and/or CD, whose density is lower than the next-generation DVD would be desirable. In this case, a tilt between the objective lenses due to an error upon the assembly of the objective lenses may be generated.

In an optical system having two objective lenses, if a tilt between the objective lenses exists, the skew of one objective lens can be adjusted so that its optical axis is perpendicular to an optical disc, while the other objective lens is tilted with respect to the optical disc.

It is known that if an objective lens is tilted, a wavefront error, particularly, a coma aberration, is generated. Hence, the wavefront error caused by its tilt must be corrected. However, existing objective lenses cannot correct the wavefront error caused by the tilt without the use of additional component elements.

As described above, because existing objective lenses cannot correct the wavefront error caused by tilt without the use of additional component elements, an optical pickup having a single objective lens needs to adjust the skew of the single objective lens during the assembly of the optical pickup if the single objective lens is tilted.

In optical pickups having two or more objective lenses, because optical discs with different recording density have different thicknesses, different working distances are required for each lens. Hence, the difference between required working distances should be considered so as to prevent a collision of an objective lens with a short working distance with an optical disc.

The two or more objective lenses may be mounted on an actuator and driven in a focusing direction and/or tracking direction. Because the number of required objective lenses is two or more, the actuator may be complicated, and a moving part of the actuator may become heavier.

SUMMARY OF THE INVENTION

One aspect of the present invention provides an optical pickup according to a first embodiment of the present invention, which has a plurality of objective lenses and is designed such as to be compatible with various types of optical information storage media with different recording densities.

Another aspect of the present invention provides an optical pickup according to a second embodiment of the present invention, which has a plurality of objective lenses, at least one objective lens among which is capable of correcting an aberration caused by tilt.

Another aspect of the present invention provides an optical pickup according to a third embodiment of the present invention, designed in consideration of the difference between working distances required by a plurality of types of optical information storage media with different recording densities, so that an objective lens having a shorter working distance is prevented from colliding with an optical disc.

Another aspect of the present invention provides an optical pickup according to a fourth embodiment of the present invention, which includes a plurality of objective lenses disposed on a single lens holder and does not cause an increase of the weight of a moving part of an actuator.

Another aspect of the present invention provides an optical pickup according to a fifth embodiment of the present invention, which includes a single objective lens in which a lens capable of correcting an aberration due to its tilt is used.

Another aspect of the present invention also provides a lens which can correct an aberration due to its tilt by adjusting the angle at which light is incident upon the lens.

Additional aspects and/or advantages of the invention will be set forth in part in the description which follows and, in part, will be obvious from the description, or may be learned by practice of the invention.

According to an aspect of the present invention, there is provided an optical pickup having a plurality of objective lenses, wherein at least one of the plurality of objective lenses is configured so that a type of wavefront error mainly generated by a tilt of the at least one of the plurality of objective lenses is the same as a type of a wavefront error mainly generated by an angle at which light is incident upon the at least one of the plurality of objective lenses.

The plurality of objective lenses includes first and second objective lenses. The first objective lens focuses an incident beam for high-density recording media to form an optical spot used to record and/or reproduce data on a high-density recording medium. The second objective lens focuses an incident beam for low-density recording media to form an optical spot used to record and/or reproduce data on a low-density recording medium. The optical pickup further comprises a light source for emitting a beam with a wavelength suitable for the high-density recording medium and at least one light source for emitting a beam with a wavelength suitable for the low-density recording medium such that high-density recording media and low-density recording media can be compatibly adopted.

The first objective lens may have a working distance WD1, the second objective lens may have a working distance WD2 which is longer than WD1, and the first and second objective lenses may be provided so that a distance D between the first objective lens and the recording medium satisfies the following Expression:

$$D = WD1 + \alpha$$

and $\alpha = |WD2 - WD1| \times (0.1 \text{-} 1.0)$.

The first objective lens may be located closer to the inside diameter of the recording medium than the second objective lens.

The first and second objective lenses may be disposed in the radial direction of the recording medium.

The optical pickup further comprises an actuator section including a single lens holder on which the objective lenses are mounted, and a magnetic circuit driving the lens holder.

The magnetic circuit is comprised of separate first and second magnetic circuits, the first magnetic circuit driving the objective lenses in a focusing direction and the second magnetic circuit driving the objective lenses in a tracking direction.

According to another aspect of the present invention, there is provided an optical pickup compatible with a high-density recording medium and a low-density recording medium. The optical pickup includes a light source emitting a beam with a wavelength suitable for the high-density recording medium, at least one light source emitting a beam with a wavelength suitable for the low-density recording medium, a first objective lens focusing the beam for the high-density recording medium to form an optical spot used to record and/or reproduce data on the high-density recording medium, a second objective lens focusing the beam for the low-density recording medium to form an optical spot used to record and/or reproduce data on the low-density recording medium, and an actuator including a single lens holder, the single lens holder having first and second installation holes disposed so to install the first and second objective lenses at different heights when respectively inserted therein, and a magnetic circuit driving the lens holder.

The first objective lens may have a working distance WD1, the second objective lens may have a working distance WD2 which is longer than WD1, and the first and second objective lenses may be provided so that a distance D between the first objective lens and the recording medium satisfies the following Expression:

$$D = WD1 + \alpha$$

and $\alpha = |WD2 - WD1| \times (0.1 - 1.0)$.

At least one of the first and second objective lenses may be configured so that the type of a wavefront error mainly generated by the tilt of the objective lens is the same as the type of a wavefront error mainly generated by an angle at which light is incident upon the objective lens.

According to the third embodiment of the present invention, there is provided an optical pickup capable of compatibly using a high-density recording medium and a low-density recording medium. The optical pickup includes a light source for the high-density recording medium, at least one light source for the low-density recording medium, first and second objective lenses, and an actuator. The light source for the high-density recording medium emits a beam with a wavelength suitable for the high-density recording medium. The at least one light source for the low-density recording medium emits a beam with a wavelength suitable for the low-density recording medium. The first objective lens has a high numeral aperture suitable for the high-density recording medium and focuses the beam for the high-density recording medium to form an optical spot used to record and/or reproduce data on the high-density recording medium. The second objective lens focuses the beam for the low-density recording medium to form an optical spot used to record and/or reproduce data on the low-density recording medium. The actuator includes a single lens holder on which the first and second objective lenses are disposed and a magnetic circuit driving the lens holder. The magnetic circuit comprises first and second magnetic circuits, the first magnetic circuit driving the first and second objective lenses in a focusing direction and the second magnetic circuit driving the first and second objective lenses in a tracking direction, such that the weight of a moving part is reduced.

The high-density recording medium is a next-generation DVD which has a higher density than a DVD, and the light source for the high-density recording medium emits a beam in a blue-violet wavelength range suitable for a next-generation DVD.

The low-density recording medium may be one of a of DVD and a CD, and the light source for the low-density recording medium is at least one of a DVD light source which emits a beam in a red wavelength range suitable for DVDs and a CD light source which emits a beam in an infrared wavelength range suitable for CDs.

According to another aspect of the present invention, there is provided an optical pickup having at least one light source and a single objective lens. The single objective lens is formed so that the type of a wavefront error mainly generated by the tilt of the objective lens is the same as the type of a wavefront error mainly generated due to an angle of an optical axis of light incident upon the objective lens.

The at least one light source may be at least one of a first light source emitting a beam in a blue-violet wavelength range suitable for high-density recording media having a higher density than DVDs, a second light source emitting a beam in a red wavelength range suitable for DVDs, and a third light source emitting a beam in an infrared wavelength range suitable for CDs, so that at least one recording medium of a high-density recording medium, a DVD-family recording medium, and a CD-family recording medium can be used.

According to another aspect of the present invention, there is provided a lens formed so that the type of a wavefront error mainly generated due to the tilt of the lens is the same as the type of a wavefront error mainly generated due to an angle of an optical axis of light incident upon the lens.

According to yet another aspect of the present invention, there is provided an optical pick up including one or more optical units light sources each of which emits a light beam and one or more objective lenses configured so that the type of a wavefront error mainly generated by the tilt of the objective lens is the same as the type of a wavefront error mainly generated due to an angle of an optical axis of the one or more light beams incident upon the one or more objective lenses.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
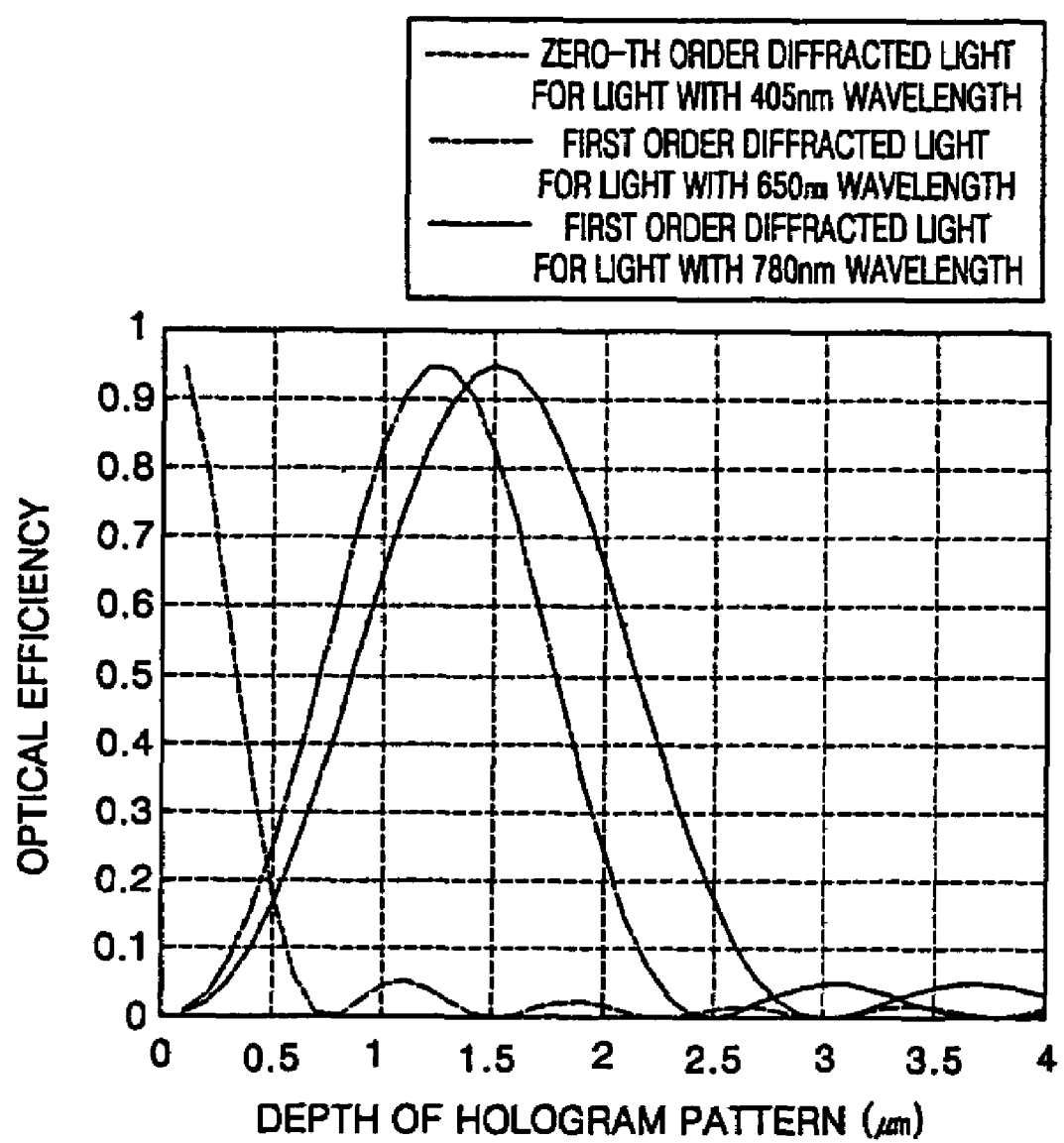
FIG. 1 is a graph showing optical efficiency with respect to the depth of a hologram pattern of a holographic optical element of an 8-step blazed type which is manufactured using silica as a base material.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A lens designed to correct an aberration caused by its tilt, according to an embodiment of the present invention, and an optical pickup using the lens as at least one objective lens included in the optical pickup will now be described in detail with reference to the accompanying drawings.

An optical pickup according to an embodiment of the present invention includes one or a plurality of objective lenses each compatible with a family of optical discs among next-generation DVD-family optical discs (hereinafter, referred to as next-generation DVDs), DVD-family optical discs (hereinafter, referred to as DVDs), and CD-family optical discs (hereinafter, referred to as CDs) or to deal with various other families of optical discs.

An optical pickup according to an embodiment of the present invention including a plurality of objective lenses will now be described. Since an embodiment of an optical pickup including a single objective lens can be sufficiently inferred from the following description of an embodiment including a plurality of objective lenses, it will not be described or shown in detail.

Figure 2:
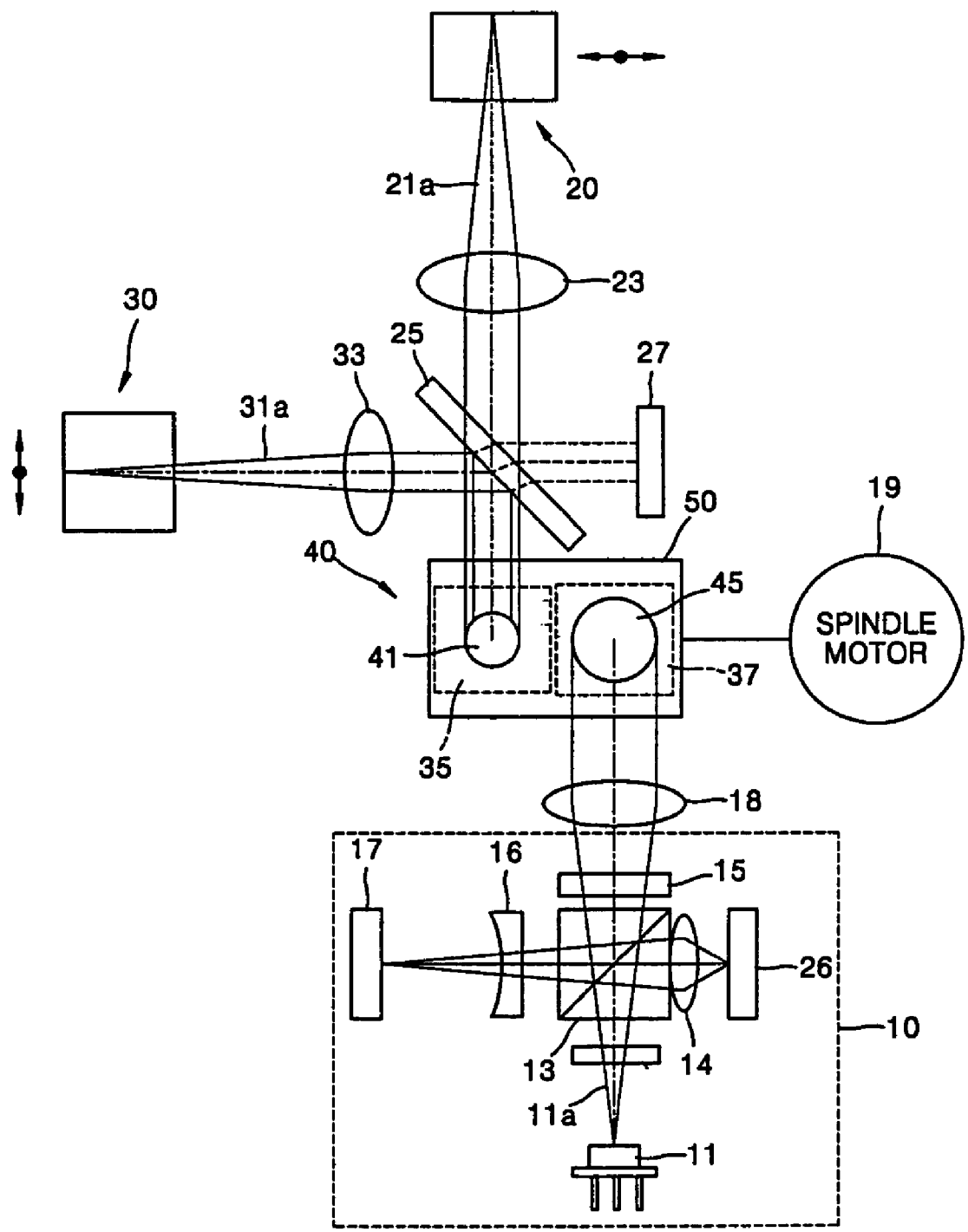
FIG. 2 is a schematic view of the optical structure of an optical pickup according to a first embodiment of the present invention.
Figure 3:
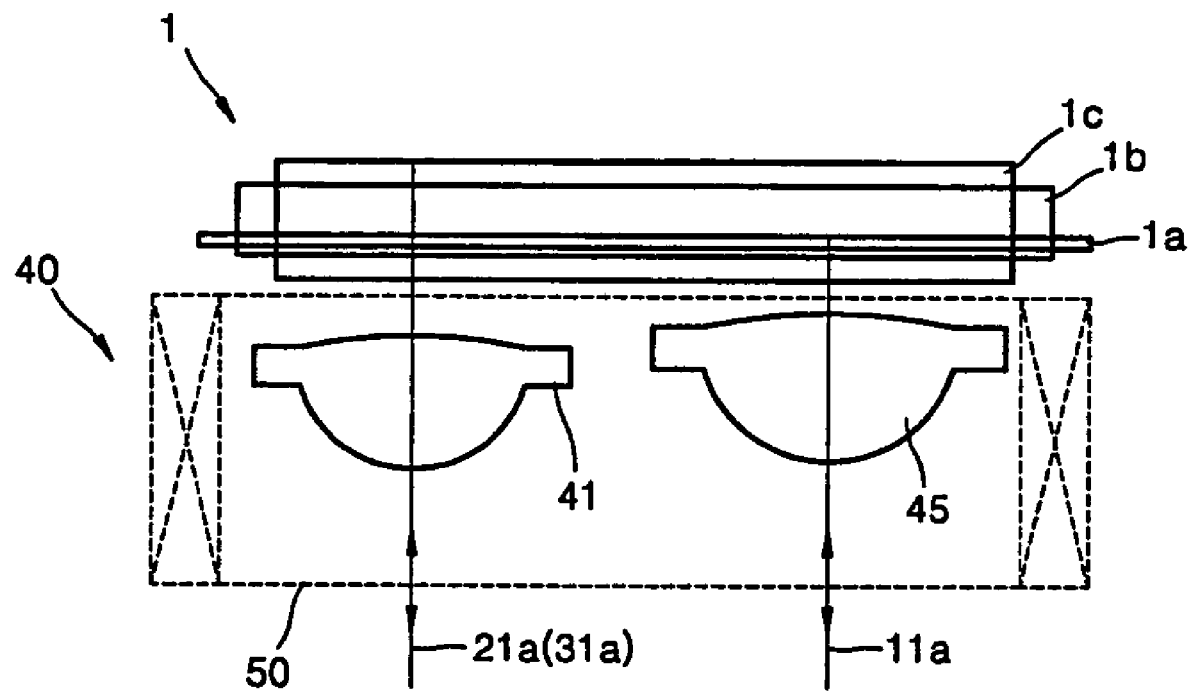
FIG. 3 is a schematic view showing paths along which light beams individually focused by the first and second objective lenses of FIG. 2 are incident upon optical discs with different thicknesses.

FIG. 2 is a schematic view of the optical structure of an optical pickup according to a first embodiment of the present invention. FIG. 3 is a schematic view showing paths along which light beams individually focused by the first and second objective lenses 45 and 41 of FIG. 2 are incident upon optical discs with different thicknesses.

Referring to FIGS. 2 and 3, in the optical pickup according to the first embodiment of the present invention, a high-density optical system for next-generation DVDs and a low-density optical system for DVDs and/or CDs are used and share an actuator 40 so that a plurality of optical discs having different recording density and different thicknesses can be used.

The optical pickup according to the first embodiment of the present invention includes an optical unit, first and second objective lenses 45 and 41, respectively, and the actuator 40. The optical unit emits light beams of different wavelengths toward a plurality of optical discs, each wavelength suitable for each of the optical discs, and receives light beams reflected by the optical discs to detect an information signal and/or an error signal. The first and second objective lenses 45 and 41 focus incident light beams so that the incident light beams are focused in the form of optical spots on the recording surfaces of the plurality of optical discs. The actuator 40 drives the first and second objective lenses 45 and 41 in a focusing and/or tracking direction.

The optical pickup according to the first embodiment of the present invention shown in FIG. 2 changes the paths of light beams emitted from the optical unit by reflection mirrors 37 and 35 so that the emitted beams are incident upon the first and second objective lenses 45 and 41.

However, the beams emitted from the optical unit may be directly incident upon the first and second objective lenses 45 and 41 without the inclusion of the reflection mirrors 37 and 35.

For example, the optical unit is comprised of first and second optical units 10 and 20, a first light path changer 25, and first and second collimating lenses 18 and 23. The first and second optical units 10 and 20 emit first and second beams 11a and 21a of different wavelengths, which are suitable for a next-generation DVD 1a and a DVD 1b, respectively, the two DVDs having different thicknesses, and receive the first and second beams 11a and 21a reflected by an optical disc 1 and detect an information reproduction signal and/or an error signal from them. The first light path changer 25 is disposed between the second optical unit 20 and the second objective lens 41. The first collimating lens 18 is disposed between the first optical unit 10 and the reflection mirror 37 for a next-generation DVD. The second collimating lens 23 is disposed between the second optical unit 20 and the first light path changer 25.

The optical pickup according to the first embodiment of the present invention having such a structure is compatible with a next-generation DVD 1a and a DVD 1b.

The optical unit further includes a third optical unit 30 and a third collimating lens 33. The third optical unit 30 emits a third beam 31a with a wavelength suitable for a CD 1c and receives the third beam 31a reflected by the optical disc 1 to detect an information reproduction signal and/or an error signal from them. The third collimating lens 33 is disposed between the third optical unit 30 and the first light path changer 25.

The optical pickup according to the first embodiment of the present invention having such a structure is compatible with a CD 1c, a next-generation DVD 1a, a DVD 1b.

As shown in FIG. 2, the first optical unit 10 may be, by way of non-limiting example, a blue-violet light source 11, a polarizing beam splitter 13, a quarter wave plate 15, a photodetector 17, and a sensing lens 16. The blue-violet light source 11 emits the first beam 11a with a blue-violet wavelength (e.g., a 405 nm wavelength) which is suitable for the next-generation DVD 1a. According to the polarization state of the first beam 11a, the polarizing beam splitter 13 transmits or reflects the incident first beam 11a. The quarter wave plate 15 with respect to the wavelength of the first beam 11a changes the state of polarization of the first beam 11a. The photodetector 17 receives the first beam 11a reflected by the optical disc 1 and detects an information reproduction signal and/or an error signal from the received first beam 11a. The sensing lens 16 is disposed between the polarizing beam splitter 13 and the photodetector 17.

The sensing lens 16 can be an astigmatism lens which causes astigmatism in the incident first beam 11a to detect a focusing error signal using an astigmatism detecting method.

To control the light output of the first light source 11, the first optical unit 10 includes a monitoring photodetector 26 for detecting the first beam 11a that is emitted from the first light source 11 and partially reflected by the polarizing beam splitter 13. The first optical unit 10 may also include a condensing lens 14 which condenses the first beam 11a reflected by the polarizing beam splitter 13 so that the first beam 11a is properly condensed on the monitoring photodetector 26.

The second optical unit 20 can be a holographic optical module for a red wavelength suitable for the DVD 1b, for example, for a 650 nm wavelength.

The third optical unit 30 can be a holographic optical module for the wavelength of a near infrared suitable for the CD 1c, for example, for a 780 nm wavelength.

It is known that the holographic optical module includes a light source for emitting light with a predetermined wavelength (e.g., a 650 nm or 780 nm wavelength), a photodetector disposed at side of the light source to receive light reflected by the optical disc 1 and detect an information signal and/or an error signal from the received light, and a holographic element which straightly transmits most of the light received from the light source while $\pm 1^{st}$-order diffracting the light reflected by the optical disc 1 so as to be transmitted toward the photodetector. The holographic optical module may further include a grating for producing sub-beams to be used in detecting a tracking error signal using, for example, a differential push-pull (dpp) technique.

In a holographic optical module including such a grating, a photodetector has a structure in which the tracking error signal can be detected using the dpp technique. The red-wavelength holographic optical module for DVDs and the near infrared wavelength holographic optical module for CDs will not be described and shown in detail.

Instead of the second and third optical units 20 and 30 being provided in the holographic optical module, they may have an optical structure in which a light source and a photodetector are separately provided.

The first optical unit 10 can be a holographic optical module for a blue-violet wavelength suitable for a next-generation DVD 1a, for example, for a 405 nm wavelength.

The first light path changer 25 is disposed between the second and third optical units 20 and 30 and the second objective lens 41, and transmits the second and third beams 21a and 31a from the second and third optical units 20 and 30 toward the second objective lens 41 and returns the second and third beams 21a and 31a reflected by the optical disc 1 back to the second and third optical units 20 and 30. The first light path changer 25 can be, by way of non-limiting example, a plate-type beam splitter having a mirror surface which transmits the second beam 21a and reflects the third beam 31a.

The first collimating lens 18 is disposed between the first optical unit 10 and the first objective lens 45, and collimates the first beam 11a divergently proceeding from the first optical unit 10 and transmits the parallel first beam 11a to the first objective lens 45.

If the optical unit includes the first collimating lens 18 which collimates the first beam 11a, the first objective lens 45 is designed to be the most suitable for the parallel first beam 11a.

The second collimating lens 23 is disposed between the second optical unit 20 and the first light path changer 25 and collimates the second beam 21a divergently proceeding from the second optical unit 20.

The third collimating lens 33 is disposed between the third optical unit 30 and the first light path changer 25 and collimates the third beam 31a divergently proceeding from the third optical unit 30.

As described above, the optical pickup according to the first embodiment of the present invention includes the first, second, and third collimating lenses 18, 23, and 33 to transmit a parallel beam to the first and second objective lenses 45 and 41. However, in an optical pickup according to the present invention, at least one out of the first, second, and third collimating lenses 18, 23, and 33 may not be included, or at least one out of the three optical systems for a next-generation DVD 1a, a DVD 1b, and a CD 1c may be a finite optical system in which a slightly convergent or divergent beam is incident upon the first and/or second objective lenses 45 and/or 41.

The optical unit also includes a monitoring photodetector 27, which is disposed at side of the first light path changer 25a and monitors the amount of the light output of the second and/or third optical units 20 and/or 30.

FIG. 2 shows an embodiment of the optical structure of the optical unit of the optical pickup according to the first embodiment of the present invention. However, it is to be understood that an optical unit of the optical pickup according to the first embodiment of the present invention is not limited to the optical unit of FIG. 2. In other words, the optical pickup according to the first embodiment of the present invention includes at least two objective lenses, and the optical unit may have various structures within the scope of the technical spirit of the present invention.

The first objective lens 45 is designed so as to form an optical spot that is suitable for recording and/or reproduction on the next-generation DVD 1a with the highest density among the next-generation DVD 1a, the DVD 1b, and the CD 1c.

When the first light source 11 emits a first beam 11 a with a blue-violet wavelength, for example, a 405 nm wavelength, and the next-generation DVD 1a is about 0.1 mm thick, the first objective lens 45 may have a high NA of 0.85 or greater.

Also, the second objective lens 41 may be designed so as to form an optical spot that is suitable for recording and/or reproducing data on a low-density optical disc, that is, the DVD 1b and/or the CD 1c.

As shown in FIG. 2, when the optical pickup according to the first embodiment of the present invention is compatible with the CD 1c, the next-generation DVD 1a, and the DVD 1b, the second objective lens 41 may be formed to be optimized for the DVD 1b and also to be compatible with the CD 1c and the DVD 1b.

On the other hand, when the optical pickup according to the first embodiment of the present invention is compatible with a next-generation DVD 1a and a DVD 1b, the second objective lens 41 may be optimized for the DVD 1b.

The second objective lens 41 may be a lens which is optimized for the DVD 1b and has two lens surfaces which are aspheric, such as, by way of non-limiting example, a lens usable in the first embodiment of the present invention to be described later.

The second objective lens 41 may also be a lens in which one of the two lens surfaces, such as, a lens surface facing an optical unit, is partially or entirely formed in a holographic pattern so as to satisfy an optimal optical performance for both DVDs and CDs, such as, by way of non-limiting example, a lens according to a second embodiment of the present invention to be described later.

In the optical pickup according to the first embodiment of the present invention, at least one of the first and second objective lenses 45 and 41 is a lens designed so that a wavefront error usually occurring due to the tilt of the lens and a wavefront error usually occurring due to an angle of light incident upon the lens can equally be the same type aberrations, such as, by way of non-limiting example, coma aberrations.

As described above, if the wavefront error usually occurring due to the tilt of a lens is the same as the wavefront error which usually occurs when light is incident upon the lens at a field angle, the wavefront error due to the tilt of the lens can be corrected by adjusting the angle at which light is incident upon the lens. Embodiments of a lens according to the present invention capable of correcting such a wavefront error due to its tilt, and a principle of correcting the same will be described later in greater detail.

On the other hand, as, if conventional DVD-only or diffractive DVD/CD compatible objective lenses are tilted, coma aberration is usually generated. Light is incident upon the tilted conventional objective lenses at a certain angle, and thus astigmatism is usually generated. Hence, the coma aberration due to the tilt of these conventional objective lenses cannot be corrected even though adjusting the angle of light incident upon the conventional objective lenses.

However, as is described below, in a lens according to the present invention, a coma aberration is usually generated due to the tilt of the lens, and a coma aberration is also usually generated due to a change in the angle at which light is incident upon the lens. Hence, the coma aberration due to the tilt of the lens can be corrected by adjusting the angle at which light is incident upon the lens.

In addition, as is described below, when coma aberrations are mainly generated due to the tilt of a lens and due to the tilt of incident light, the second most generated aberration is astigmatism in the two cases. Accordingly, the wavefront error due to the tilt of the lens can be effectively corrected by adjusting the incidence angle of light.

Figure 4:
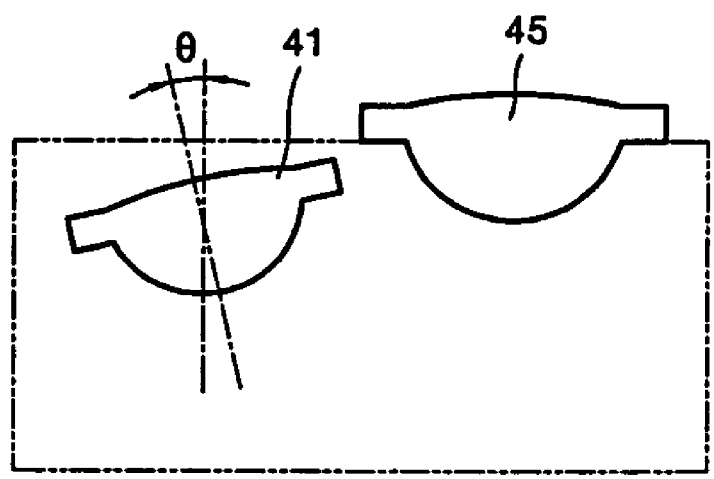
FIG. 4 shows a case where the second objective lens is tilted by θ against the first objective lens due to an assembly error in the optical pickup of FIG. 2.

Thus, if such a lens according to the present invention is used as the second objective lens 41 for low-density optical discs, and the skew of the first objective lens 45 with respect to an optical disc or the skew of the optical pickup according to the first embodiment of the present invention having the first objective lens 45 is controlled so that the optical pickup is suitable for high-density optical discs, even when the second objective lens 41 is tilted with respect to the first objective lens 45 due to an assembly error as shown in FIG. 4, a wavefront error due to the tilt of the second objective lens 41 can be corrected. The wavefront error correction can be achieved by a process in which the angle at which the second and/or third beams 21a and/or 31a are incident upon the second objective lens 41 is controlled by moving the second and/or third optical units 20 and/or 30 or their light sources within a plane perpendicular to an optical axis along which the second and/or third beams 21a and/or 31a travel.

Alternatively, the lens according to the present invention may be used as the first objective lens 45, and the skew of the second objective lens 41 or the skew of the entire optical pickup having the second objective lens 41 may be controlled so that the optical pickup is suitable for low-density optical discs. Alternatively, if the lens according to the present invention is used as each of the first and second objective lenses 45 and 41, the skew controlling process can be omitted.

As described above, the optical pickup according to the first embodiment of the present invention can correct a wavefront error caused by a tilt between the two objective lenses 45 and 41. Hence, even if the two objective lenses 45 and 41 are tilted and mounted on the actuator 40, a good reproduction signal can be obtained as in the case where the first and second objective lenses 45 and 41 are not tilted against the optical disc 1.

Figure 5:
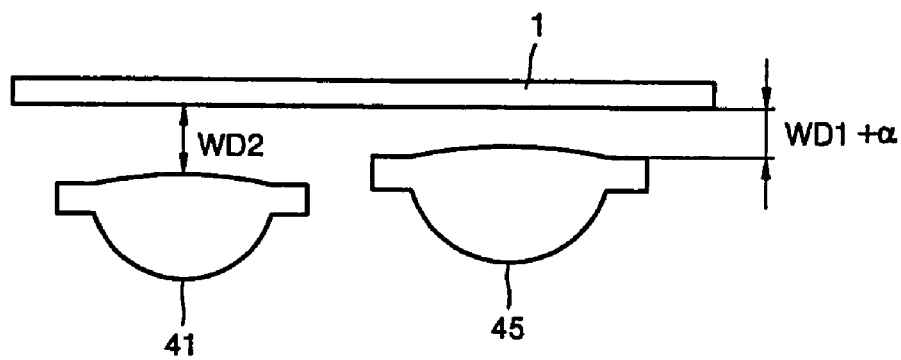
FIG. 5 shows a case in which the first and second objective lenses of FIG. 2 are configured to be apart from an optical disc at working distances satisfying Equation 3.

In an optical pickup according to an embodiment of the present invention, the first and second objective lenses 45 and 41 are disposed at different heights on a lens holder 50 of the actuator 40 in consideration of the difference between working distances required according to the type of optical discs. To be more specific, the first and second objective lenses 45 and 41 are disposed as shown in FIG. 5 so as to prevent the first objective lens 45 for high-density optical discs, which has a short working distance, from colliding with the optical disc 1 while the optical disc 1 is being installed and/or while the second objective lens 41 for low-density optical discs, which has a long working distance, is operating, that is, so as to satisfy Equation 3:

$$WD2 \geq WD1$$

Basic separating distance of a first objective lens from an optical disc=WD1+α

Here, α=|WD2-WD1|×(0.1-1.0)　　　(3)

wherein WD1 denotes a working distance of the first objective lens 45 and WD2 denotes a working distance of the second objective lens 41. In other words, it is preferable that the first objective lens 45 is disposed such that its basic separating distance from the optical disc 1 is greater than the working distance of the first objective lens 45.

The first and second objective lenses 45 and 41 are disposed in a direction R, which corresponds to the radial direction of the optical disc 1, because an optical pickup records and/or reproduce an information signal while moving in the radial direction of the optical disc 1 within an optical recording and/or reproducing apparatus.

When the first and second objective lenses 45 and 41 are aligned with each other in the radial direction of the optical disc 1, the first objective lens 45 for high-density optical discs is installed closer to the inner diameter of the optical disc 1 than the second objective lens 41 for low-density optical discs to achieve compatibility with existing recordable DVD cartridges.

Also, when the first and second objective lenses 45 and 41 are aligned with each other in the radial direction of the optical disc 1, an optical recording and/or reproducing apparatus using an optical pickup according to the present invention includes a spindle motor 19, which is smaller than existing spindle motors, to rotate the optical disc 1 and accordingly can read data from the innermost boundary of the DVD 1b and/or CD 1c by using the second objective lens 41 located near the outside diameter of the optical disc 1.

Also, when the first and second objective lenses 45 and 41 are aligned with each other in the radial direction of the optical disc 1, the first and second objective lenses 45 and 41 and the spindle motor 19 are all aligned so as to equalize the phases of a tracking signal at the inner and outer boundaries of an optical pickup.

Here, the direction of the configuration of the first and second objective lenses 45 and 41 is not limited to the radial direction of the optical disc 1.

For example, an optical pickup according to the present invention includes a shaft-type actuator, and the first and second objective lenses 45 and 45 can be located at suitable places in a switching way. Of course, even when this shaft-type actuator is used, it is possible that the basic separating distance between each of the first and second objective lenses 45 and 41 and the optical disc 1 satisfies Equation 3.

The actuator 40 may be a 2 axial driving device, which includes a moving part, on which the first and second objective lenses 45 and 41 having different working distances are mounted. The moving part can independently move in the axial direction of light and in the radial direction of the optical disc 1, that is, in focusing and tracking directions. Alternatively, the actuator 40 may be a 3 axial driving device capable of controlling its tilt.

In the optical pickup shown in FIG. 2, the actuator 40 is a single actuator in which the first and second objective lenses 45 and 41 are mounted on the single lens holder 50. Alternatively, the optical pickup according to the first embodiment of the present invention may include two actuators to respectively mount the first and second objective lenses 45 and 41 thereon and to independently drive them.

Figure 6:
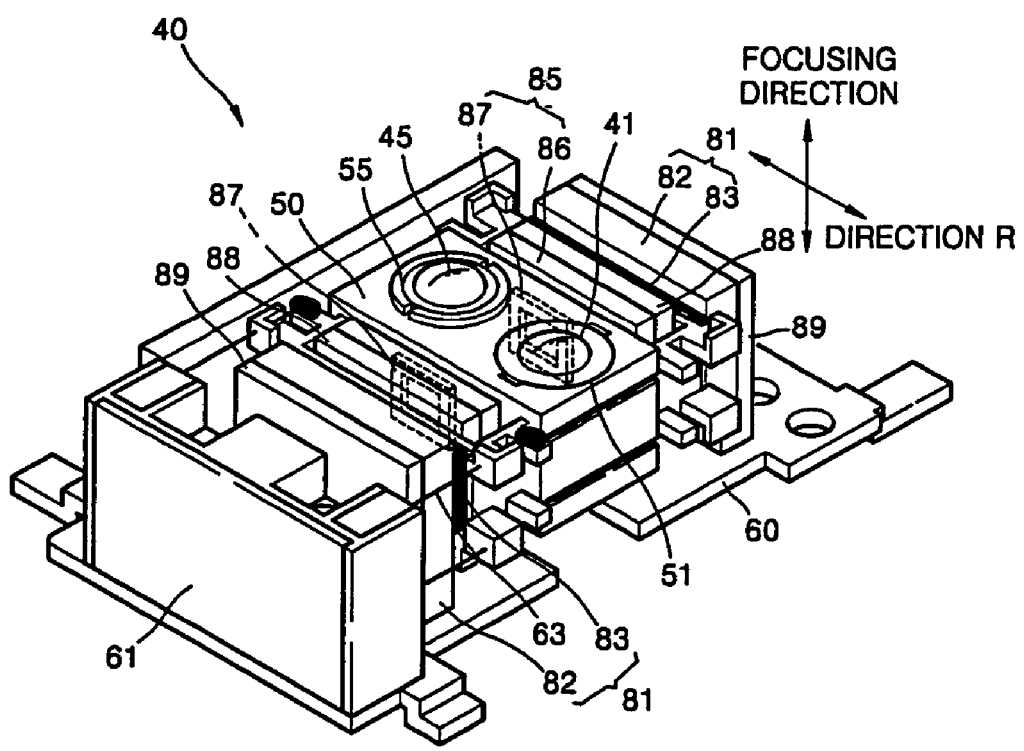
FIG. 6 is a perspective view of an embodiment of the actuator used in the optical pickup according to the first embodiment of the present invention.
Figure 7:
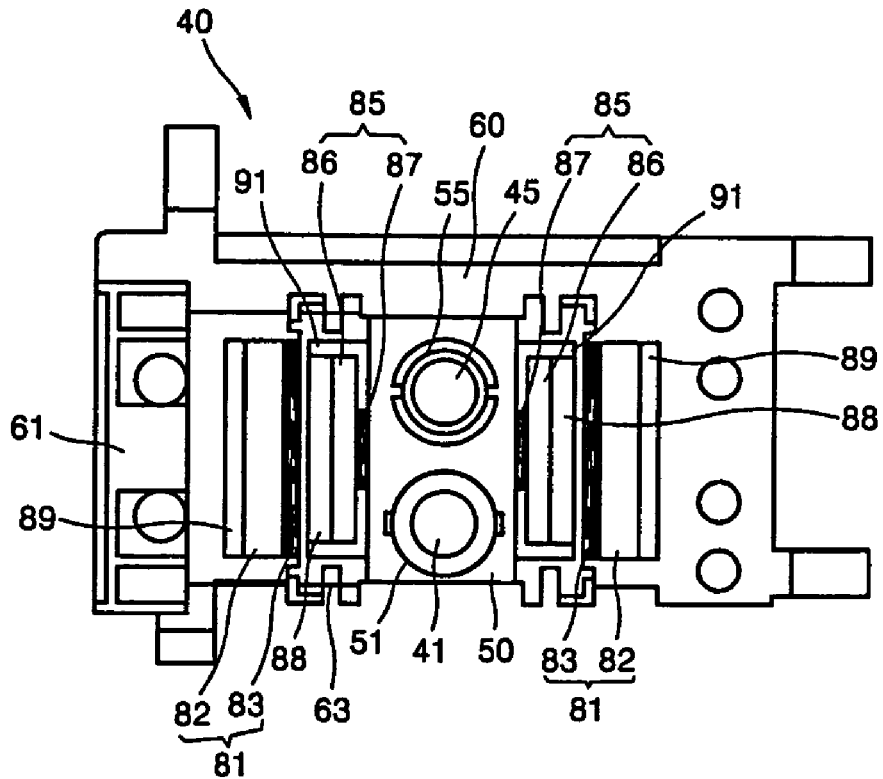
FIG. 7 is a top view of the actuator of FIG. 6.

FIG. 6 is a perspective view of an embodiment of the actuator 40 used in the optical pickup according to the first embodiment of the present invention. FIG. 7 is a top view of FIG. 6.

Figure 8:
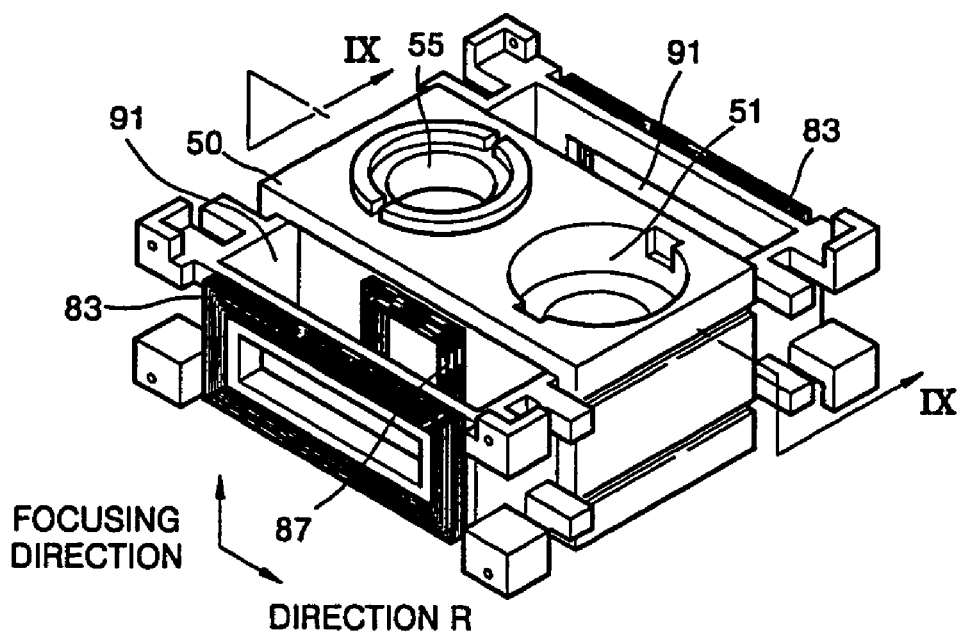
FIG. 8 is a perspective view of the lens holder shown in FIG. 6.
Figure 9:
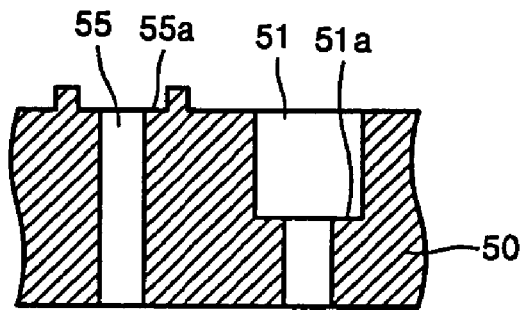
FIG. 9 is a cross-section taken along line IX-IX of FIG. 8.

FIG. 8 is a perspective view of the lens holder 50 shown in FIG. 6. FIG. 9 is a cross-section taken along line IX-IX of FIG. 8.

The actuator 40 shown in FIGS. 6 through 8 has a structure in which the first and second objective lenses 45 and 41 are mounted on a single lens holder 50.

To be more specific, the actuator 40 used in the optical pickup according to the first embodiment of the present invention includes a base 60 onto which a holder 61 is fixed, the single lens holder 50 having a plurality of installation holes 51 and 55 on which the first and second objective lenses 45 and 41 having different working distances are installed, a support member (suspension) 63 having one end fixed to the lens holder 50 and the other end fixed to the holder 61 to movably support the lens holder 50, and a magnetic circuit which drives the lens holder 50 in focusing and tracking directions.

If an optical pick according to the present invention includes at least three objective lenses having different working distances and records and/or reproduces at least three types of optical discs having different recording density, the at least three objective lenses can be installed on the lens holder 50.

The lens holder 50 is installed so that the first and second objective lenses 45 and 41 are aligned in the radial direction of an optical disc, that is, in direction R, because an optical pickup records and/or reproduces an information signal while moving in the radial direction of an optical disc within an optical disc drive.

The lens holder 50 is formed so that the first objective lens 45 for high-density optical discs can be installed closer to the inner diameter of the optical disc than the second objective lens 41 for low-density optical discs.

If the actuator 40 used in the optical pickup according to the first embodiment of the present invention has the structure in which the two objective lenses 45 and 41 are mounted on the lens holder 50, as shown in FIG. 8, the lens holder 50 has first and second installation holes 55 and 51 for mounting the first and second objective lenses 45 and 41, respectively, thereon. Here, the number of installation holes formed in the lens holder 50 is the same as the number of objective lenses to be mounted.

For example, the first and second installation holes 55 and 51 are aligned in direction R. Considering the difference between the working distances of the first and second objective lenses 45 and 41, the first and second installation holes 55 and 51 are formed so that the first and second objective lenses 45 and 41 can be installed at different heights as shown in FIGS. 8 and 9.

To be more specific, an installation projection 55a is formed in the first installation hole 55 to be at the same level as or near the same level as the upper surface of the lens holder 50 facing the optical disc 1, such that the first objective lens 45 for high-density optical discs, which has a short working distance, can be installed.

An installation projection 51a is formed in the second installation hole 51 at a position relatively lower from the upper surface of the lens holder 50 facing the optical disc 1, such that the second objective lens 41 for low-density optical discs, which has a long working distance, can be installed.

The first and second installation holes 55 and 51 are formed so that the first and second objective lenses 45 and 41 are installed to satisfy Equation 3 to prevent the first objective lens 45 having a short working distance from colliding (interfering) with an optical disc when the optical disc is initially installed and when the first objective lens 45 having a long working distance operates.

Referring back to FIGS. 6 and 7, the magnetic circuit is separated into a first magnetic circuit 81 for driving the first and second objective lenses 45 and 41 in a focusing direction and a second magnetic circuit 85 for driving the first and second objective lenses 45 and 41 in a tracking direction. Accordingly, the weight of a moving part is reduced.

The first and second magnetic circuits 81 and 85 are installed at the same side of the lens holder 50 (preferably, at a side parallel to the direction R).

When the first and second objective lenses 45 and 41 have been mounted on the lens holder 50, the moving part includes the lens holder 50, the first and second objective lenses 45 and 41, and a portion such as, by way of non-limiting example, focusing and tracking coils 83 and 87 of the magnetic circuit installed in the lens holder 50.

The first magnetic circuit 81 includes the focusing coil 83 and a focusing magnet 82.

The focusing coil 83 is installed on both side surfaces of the lens holder 50 in the direction R, and the focusing magnet 82 is installed on the base 60 so as to face the focusing coil 83.

Figure 10:
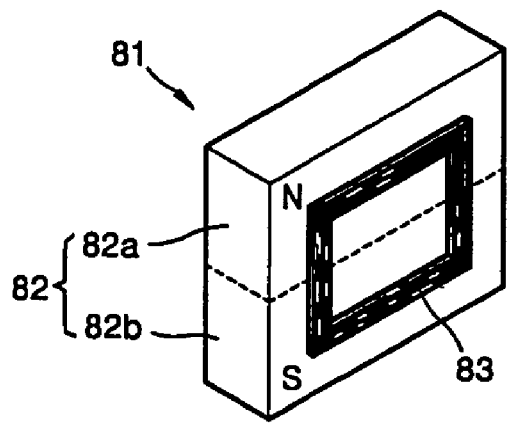
FIG. 10 is a schematic perspective view of a first magnetic circuit used in the actuator of FIG. 6.

As shown in FIG. 10, the focusing magnet 82 is a two-pole magnetized polarization magnet, and the focusing coil 83 has a rectangular shape in which its longer sides are put on N-pole and S-pole portions 82a and 82b of the focusing magnet 82. However, it is to be understood that the focusing magnet 82 and the focusing coil 83 may have other configurations.

Figure 11A:
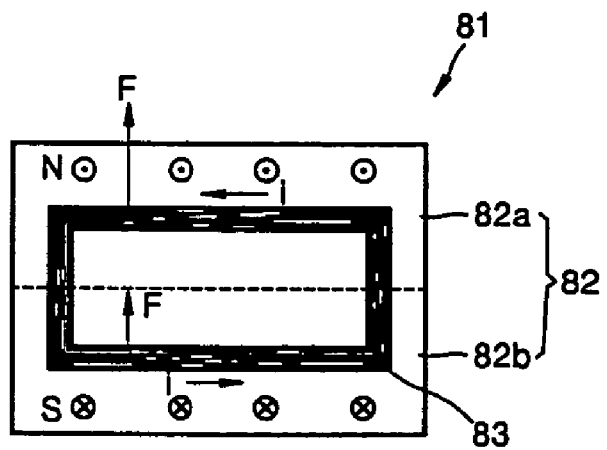
FIGS. 11A and 11B show the principle by which a lens holder is driven by the first magnetic circuit of FIG. 10 in a focusing direction.
Figure 11B:
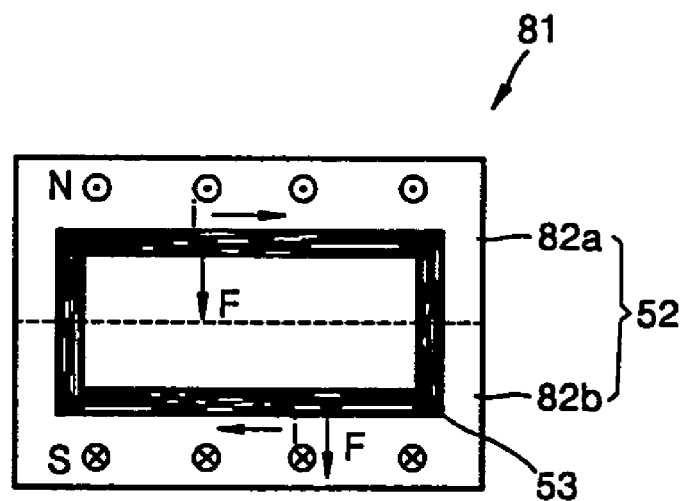

In this case, as shown in FIGS. 11A and 11B, a pair of longer sides of the focusing coil 83 serves as an effective focusing coil which can contribute to generating an electromagnetic force. As described above, if the two longer sides of the rectangular focusing coil 83 serves as an effective focusing coil, the overall length of the focusing coil 83 installed in the moving part of the actuator can be reduced.

When the N-pole portion 82a of the focusing magnet 82 is located in the upper side of the S-pole portion 82b, and a magnetic flux comes from the N-pole portion 82a in the direction like coming from the paper, if current flows counterclockwise as shown in FIG. 11A, the two longer sides of the focusing coil 83 are forced to move upward in the direction F according to the Fleming's left hand rule. On the other hand, if current flows clockwise as shown in FIG. 11B, the two longer sides of the focusing coil 83 are forced to move downward in the direction F according to the Fleming's left hand rule.

Hence, the position of the lens holder 50 where the first and second objective lenses 45 and 41 are installed in a focusing direction can be controlled by adjusting the polarity and amount of current applied to the focusing coil 83.

Referring back to FIGS. 6 and 7, the second magnetic circuit 85 includes a tracking coil 87 and a tracking magnet 86.

The tracking coil 87 is installed on both side surfaces of the lens holder 50, and the tracking magnet 86 is installed on the base 60 so as to face the tracking coil 87.

Figure 12:
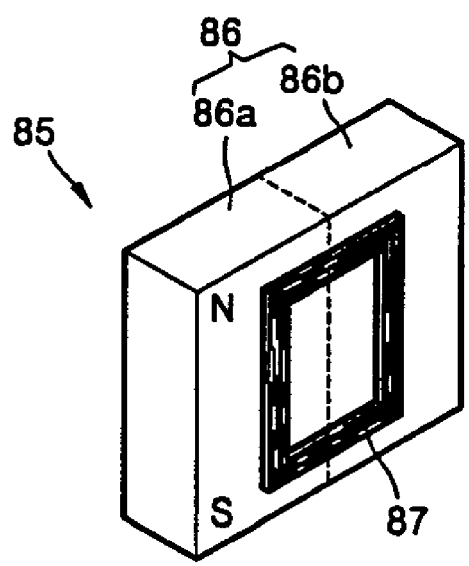
FIG. 12 is a schematic perspective view of an embodiment of a second magnetic circuit used in the actuator of FIG. 6.

As shown in FIG. 12, the tracking magnet 86 is a polarization magnet magnetized into two poles in the direction R, and the tracking coil 87 has a rectangular shape in which its longer sides are put on N-pole and S-pole portions 86a and 86b of the tracking magnet 86. In this case, as shown in FIGS. 13A and 13B, a pair of longer sides of the tracking coil 87 serves as an effective tracking coil which can contribute to generating a magnetic force.

As described above, when the two longer sides of the rectangular tracking coil 87 serve as an effective tracking coil, the overall length of the tracking coil 87 installed in the moving part of the actuator can be reduced.

Figure 13A:
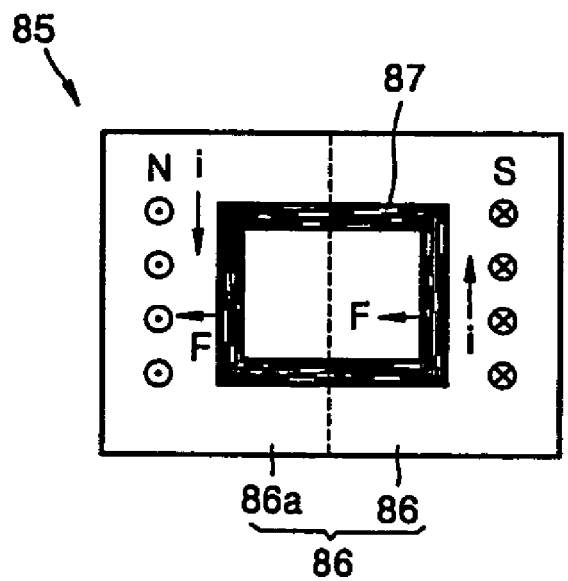
FIGS. 13A and 13B show principle in which a lens holder is driven by the second magnetic circuit of FIG. 10 in a tracking direction.
Figure 13B:
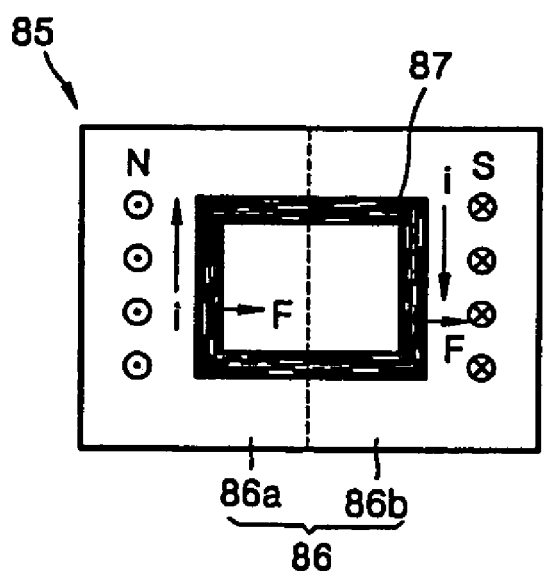

When the N-pole portion 86a of the tracking magnet 86 is located on the left side of the S-pole portion 86b, and a magnetic flux comes from the N-pole portion 86a in the direction like coming from the paper, if current flows counterclockwise as shown in FIG. 13A, the two longer sides of the tracking coil 87 are forced to move leftward in the direction F. On the other hand, if current flows clockwise as shown in FIG. 13B, the two longer sides of the tracking coil 87 are forced to move rightward in the direction F.

Hence, the positions of the lens holder 50 where the first and second objective lenses 45 and 41 are installed in a tracking direction can be controlled by adjusting the polarity and amount of current applied to the tracking coil 87.

Figure 14:
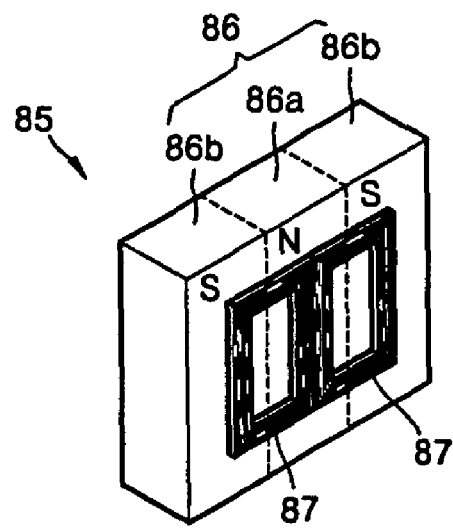
FIG. 14 is a schematic perspective view of another embodiment of a second magnetic circuit used in the actuator of FIG. 6.

Alternatively, as shown in FIG. 14, the tracking magnet 86 can be a polarization magnet magnetized into three poles in the direction R. In this case, a pair of tracking coils 87 are formed so that their longer sides range on a N-pole portion 86a and two S-pole portions 86b of the three-pole magnetized polarization magnet 86.

In the configuration of the three-pole magnetized polarization magnet 86 and the two tracking coils 87 shown in FIG. 14, the direction where the tracking coils 87 are forced according to the direction of current flowing can be sufficiently inferred from FIGS. 13A and 13B, so it will not be described in detail.

Consequently, the magnetic circuit having a structure as described above can increase the lengths of an effective focusing coil and an effective tracking coil and accordingly can reduce the overall lengths of the focusing coil 83 and the tracking coil 87. Thus, the weight of the moving part can be reduced.

Referring back to FIGS. 6 and 7, the actuator 40 further includes inner and outer yokes 88 and 89, which guide a magnetic flux generated by the focusing magnet 82 and increase the intensity of an effective magnetic field for generating a driving force in a focusing direction.

Figure 15:
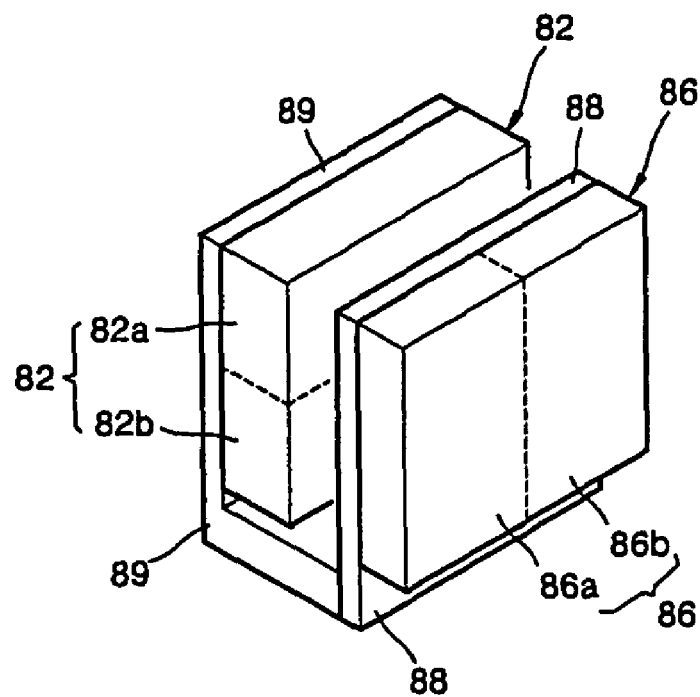
FIG. 15 is a schematic perspective view of the focusing magnet of FIG. 6 and the inner and outer yokes of FIG. 6 for guiding a magnetic flux that is generated by the focusing magnet.

FIG. 15 is a schematic perspective view of the focusing magnet 82 of FIG. 6 and the inner and outer yokes 88 and 89 for guiding a magnetic field generated by the focusing magnet 82. The inner and outer yokes 88 and 89 can be incorporated into the base 60 based on the use of the same material with the base 60. The actuator 40 may include only one of the inner and outer yokes 88 and 89 to guide a magnetic flux that is generated by the focusing magnet 82.

When the actuator 40 includes the inner and outer yokes 88 and 89, the focusing magnet 82 is installed on a side of the outer yoke 89 which faces the lens holder 50, and the inner yoke 88 is placed between the focusing coil 83 and the center of the lens holder 50.

In this case, as shown in FIG. 8, the lens holder 50 further includes an insertion hole 91 into which the inner yoke 88 is inserted.

As shown in FIGS. 6 and 15, the inner yoke 88 can be used as a mount on which the tracking magnet 86 of the second magnetic circuit 85 is installed. The tracking magnet 86 is installed on an area of a side of the inner yoke 88, which faces the center of the lens holder 50. The tracking coil 87 is installed in the lens holder 50 so that the tracking coil 87 can face the tracking magnet 86 in the insertion hole 91.

As described above, if the actuator 40 includes the inner and outer yokes 88 and 89, the inner yoke 88 is used as a mount for mounting the tracking magnet 86 thereon, and the tracking coil 87 is installed on an area of a side of the insertion hole 91, which faces the center of the lens holder 50, the insertion hole 91 is formed in a size where motions of the lens holder 50 in the focusing and tracking directions are not affected by the inner yoke 88, the track magnet 86, and the track coil 86 located in the insertion hole 91. When the lens holder 50 largely deviates from a desired position, the lens holder 50 is caught in the inner yoke 88 inserted into the insertion hole 91, such that the motions are limited. Accordingly, the inner yoke 88 guides the motion of the lens holder 50.

As described above with reference to FIGS. 6 and 15, if the intensity of an effective magnetic field is maximized by including the inner and outer yokes 88 and 89, a polarization magnet magnetized into two poles in a focusing direction is used as the focusing magnet 82, and the focusing coil 83 is formed in a rectangular shape so that its longer sides range over the N-pole and S-pole portions of the focusing magnet 82, the length of the focusing coil 83 for generating a desired amount of magnetic driving force and the volume depending on the length can be reduced.

Also, if a polarization magnet magnetized into two or three poles in the direction R is used as the tracking magnet 86, and the tracking coil 87 is formed in a rectangular shape so that its longer sides range over the N-pole and S-pole portions 86a and 86b of the tracking magnet 86, the length of the tracking coil 87 for generating a desired amount of magnetic driving force and the volume depending on the length can be reduced. Consequently, if magnetic circuits are constructed in such a way that polarization magnets are used as the focusing and tracking magnets 82 and 86, the weight of the moving part can be greatly reduced.

In the actuator 40, two objective lenses 45 and 41 are mounted on the lens holder 50. Hence, an objective lens mounted on the lens holder 50 of the actuator 40 is heavier than general actuators in which only one objective lens is installed on a lens holder. However, in the actuator 40, the magnetic circuit is divided into a first magnetic circuit 81 for driving objective lenses in a focusing direction and a second magnetic circuit 85 for driving objective lenses in a tracking direction, and polarization magnets are used as the focusing and tracking magnets 82 and 86. Hence, compared to general actuators, the actuator 40 can reduce the weight of portions (i.e., the focusing and tracking coils 83 and 87) of the magnetic circuits 81 and 85, the portions included in the moving part and provides high electromagnetic forces for driving objective lenses in the focusing and tracking directions.

Consequently, although the moving part of the actuator 40 having such a structure is heavier than that of a general actuator in which a single objective lens is mounted on a lens holder, degradation of the sensitivity can be prevented.

Furthermore, the moving part of the actuator 40 can be made lighter than that of a general actuator in which a single objective lens is mounted on a lens holder.

As described above, to compatibly record/reproduce data on at least two types of optical discs having different recording densities, the optical pickup according to the first embodiment of the present invention can include the actuator 40 in which the first and second objective lenses 45 and 41 are mounted on the single lens holder 50.

The actuator 40 is just an example of an actuator having a single lens holder, which can be applied to the optical pickup according to the first embodiment of the present invention, so its structure can be modified into various forms.

The actuator 40 is applicable not only to the optical pickup according to the first embodiment of the present invention but also to various types of optical pickups for recording and/or reproducing data on two types of optical discs with different recording densities (e.g., a next-generation DVD and a DVD) or for recording and/or reproducing data on three or more types of optical discs (e.g., a next-generation DVD, a DVD, and a CD).

Lenses usable with first and second embodiments of the present invention which can correct a wavefront error caused by a lens tilt, that is, a coma aberration, by controlling the angle at which light is incident upon the lens, that is, a field angle, will now be described in detail by referring to their design conditions.

Conventional DVD objective lenses used in DVD optical pickups may have design data as shown in Table 1. Table 1 shows a general DVD objective lens designed so as to have a 0.60 NA and a 2.33 mm focal length with respect to light with a 650 nm wavelength.

TABLE 1

| Surface | Radius of curvature (mm) | Thickness/interval (mm) | Material (glass) |
|---|---|---|---|
| Object surface | INFINITY | INFINITY | |
| S1 (STOP) | INFINITY | 0.000000 | |
| S2 (aspheric surface 1) | 1.524695 K: −0.999516 A: 0.196897E−01 B: 0.244383E−02 C: −.122518E−02 D: 0.665700E−03 E, F, G, H, J: 0.000000E+00 | 1.200000 | BaCD5_HOYA |
| S3 (aspheric surface 2) | −9.329718 K: −126.613634 A: 0.121802E−01 B: −.885067E−02 C: 0.566035E−02 D: −.117224E−02 E, F, G, H, J: 0.000000E+00 | 0.000000 | |
| S4 | INFINITY | 1.273350 | |
| S5 | INFINITY | 0.600000 | 'CG' |
| S6 | INFINITY | 0.000000 | |
| Image surface | INFINITY | 0.000000 | |

In Table 1 and tables to be described later, BaCD5_HOYA is an optical material used to form an objective lens and has a refractive index of 1.586422 for light with a 650 nm wavelength and a refractive index of 1.582509 for light with a 780 nm wavelength. Also, 'CG' is an optical material ranging between the light incidence surface and the recording surface of an optical disc and has a refractive index of 1.581922 for light with a 650 nm wavelength and a refractive index of 1.575091 for light with a 780 nm wavelength.

An aspheric surface expression with respect to the aspheric surface of a lens is shown in Equation 4 if a depth from the apex of the aspheric surface is z:

$$z = \frac{ch^2}{1+\sqrt{1-(1+K)c^2h^2}} + Ah^4 + Bh^6 + Ch^8 + Dh^{10} + Eh^{12} + Fh^{14} + Gh^{16} + Hh^{18} + Jh^{20} \quad (4)$$

wherein h denotes a height from an optical axis, c denotes a curvature, K denotes a conic coefficient, and A through J are aspheric coefficients.

Figure 16:
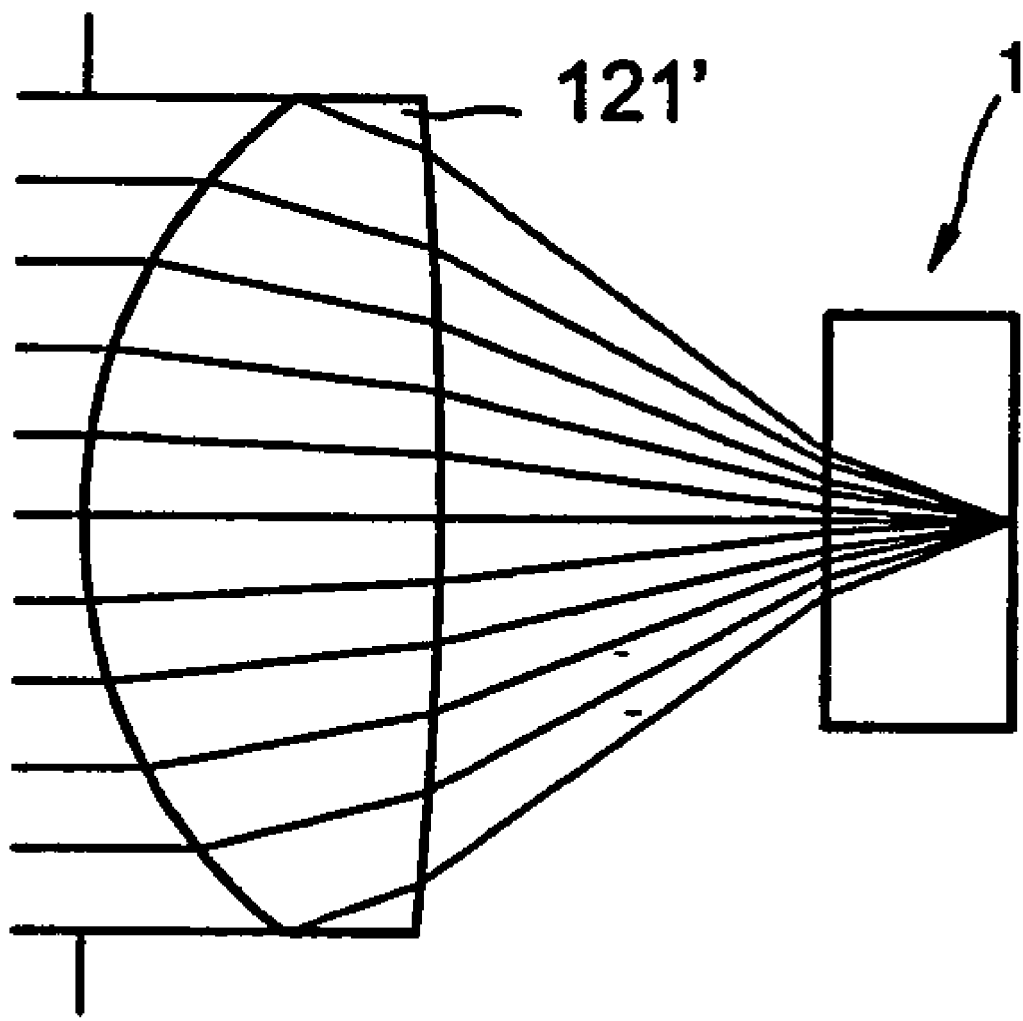
FIG. 16 shows light paths formed by a conventional objective lens for DVDs which has the design data of Table 1.
Figure 17A:
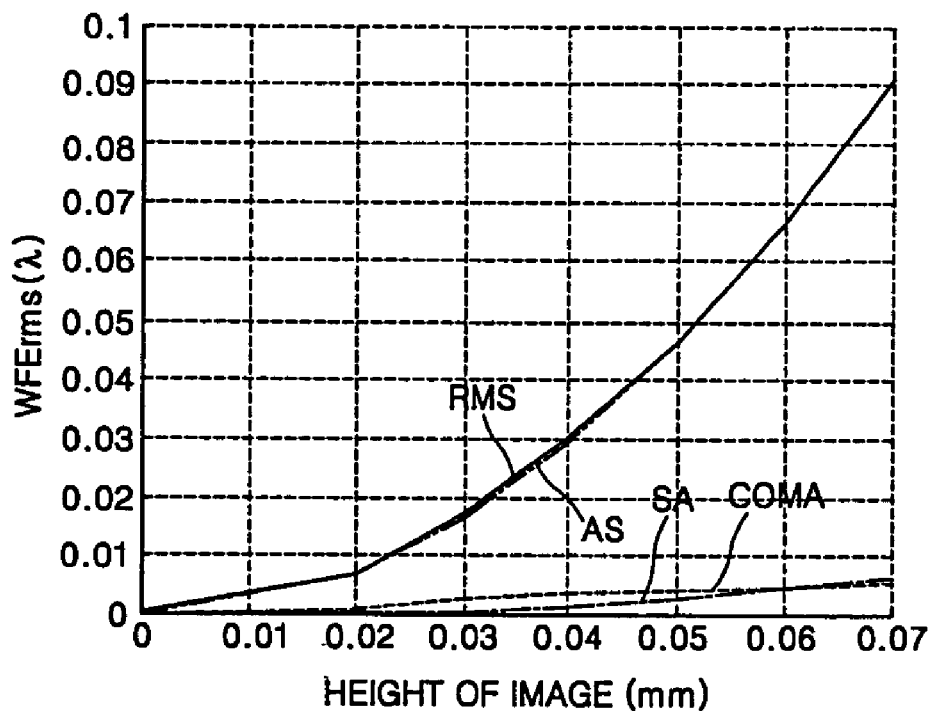
FIGS. 17A and 17B show a wavefront error feature with respect to a variation of the height of an image on an image surface according to a variation of the angle of light incident upon a conventional DVD objective lens having the design data of Table 1, and a wavefront error feature with respect to the tilt of the conventional DVD objective lens, respectively.

FIG. 16 shows light paths obtained by a conventional DVD objective lens 121' which is designed using the design data of Table 1. The conventional DVD objective lens 121', which is designed using the design data of Table 1 and produces the light paths of FIG. 6, has a wavefront error as shown in FIG. 17A with respect to the height of an image on the image surface of the conventional DVD objective lens 121', the height varying according to a light incidence angle. Also, the conventional DVD objective lens 121' has a wavefront error as shown in FIG. 17B with respect to the tilt of the conventional DVD objective lens 121'.

Figure 17B:
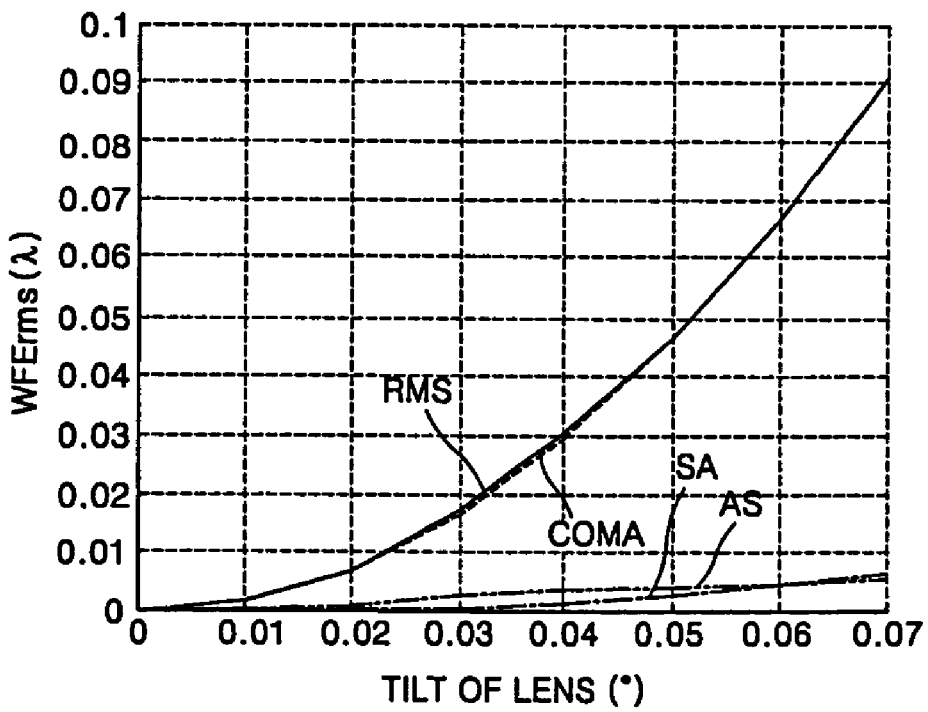

In the graphs of FIGS. 17A and 17B, WFErms ($\lambda$) in the vertical axis denotes a root mean square (rms) value of a wavefront error (WFE) expressed in a wavelength unit $\lambda$. Also, AS denotes astigmatism, COMA denotes a coma aberration, SA denotes a spherical aberration, and RMS denotes an rms, that is, a $\sqrt{AS^2+COMA^2+SA^2}$ value, of the AS, the COMA, and the SA.

As can be seen from FIGS. 17A and 17B, in the conventional DVD objective lens 121' of FIG. 16, astigmatism mainly occurs when the height of an image on an image surface varies according to the light incidence angle, and coma aberration mainly occurs when the tilt of the conventional DVD objective lens 121' varies.

Hence, in an optical pickup using the conventional DVD objective lens 121', a wavefront error caused by the tilt of the DVD objective lens 121' cannot be corrected by adjusting the angle at which light is incident upon the DVD objective lens 121'. The failure in the wavefront error correction can be checked as shown by the aberration diagrams of FIGS. 18A and 18B.

In the optical pickup of FIG. 2, when the conventional DVD objective lens 121' is used as the second objective lens 41 for DVDs/CDs, and the first and second objective lenses 45 and 41 are installed on the lens holder 50 of the actuator 40 so that the second objective lens 45 is tilted by 0.5 degrees against the first objective lens 45 for next-generation DVDs, if the optical pickup or the actuator 40 is skewed so as to be optimized for high-density optical discs, the second objective lens 41 is tilted 0.5 degrees against the DVD 1b and/or the CD 1c. In this case, the second objective lens 41 generates a wavefront error of 0.0514 $\lambda$rms.

Even though light sources for the DVD 1b and/or the CD 1c, that is, the second and/or third optical units 20 and 30 of FIG. 2, are moved within a plane perpendicular to the proceeding direction of light so that the optical axis of the second and/or third beams 21a and 31a incident upon the second objective lens 41 is tilted 0.16 degrees, the wavefront error occurring in the second objective lens 41 is not reduced much and thus is 0.0498 $\lambda$rms. This is because the correction of the wavefront error cannot be focused on correcting the coma aberration because a main aberration occurring in the conventional DVD objective lens 121' due to the lens tilt is a coma aberration but a main aberration occurring due to field characteristics is an astigmatism.

Figure 18A:
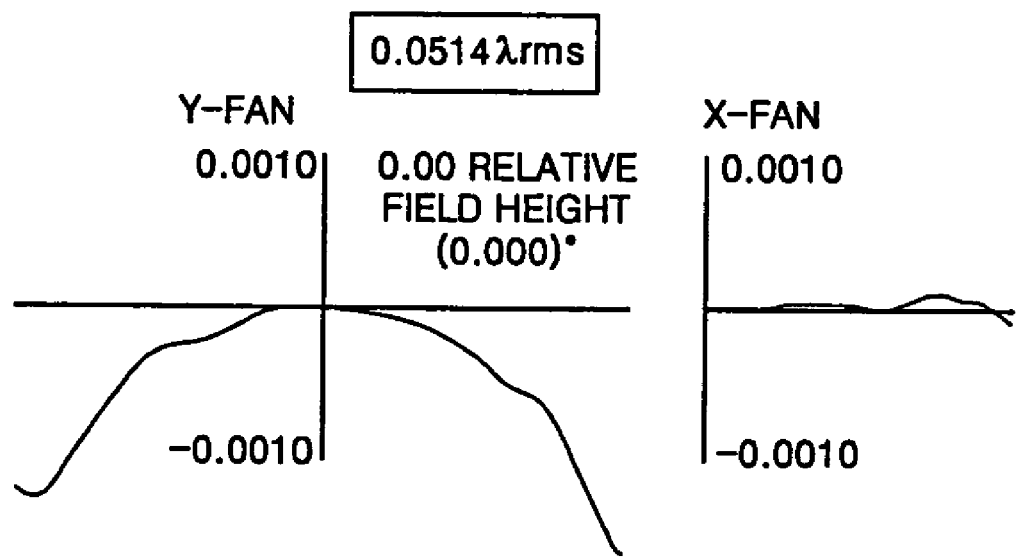
FIG. 18A is a diagram of an aberration when a wavefront error of 0.0514 λrms appears in a conventional DVD objective lens.
Figure 18B:
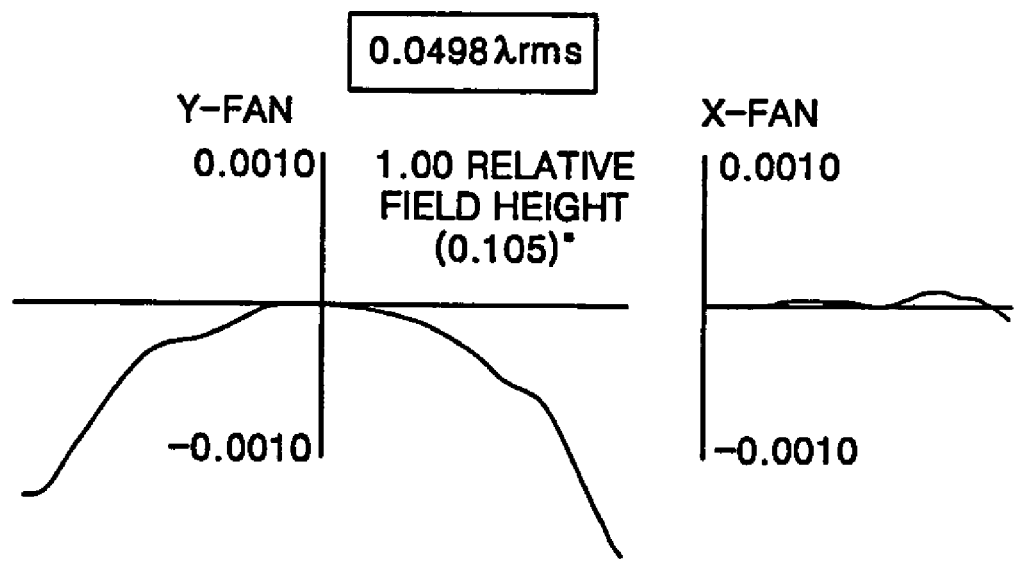
FIG. 18B is a diagram of an aberration when a wavefront error of 0.0498 λrms appears in a conventional DVD objective lens.

FIG. 18A shows an aberration diagram when a wavefront error of 0.0514 $\lambda$rms occurs, and FIG. 18B shows an aberration diagram when a wavefront error of 0.0498 $\lambda$rms occurs. As shown in FIGS. 18A and 18B, in general DVD objective lenses, a wavefront error caused by the tilt of a lens cannot be corrected even by adjusting the angle at which the optical axis of light incident upon the lens is tilted.

Figure 19:
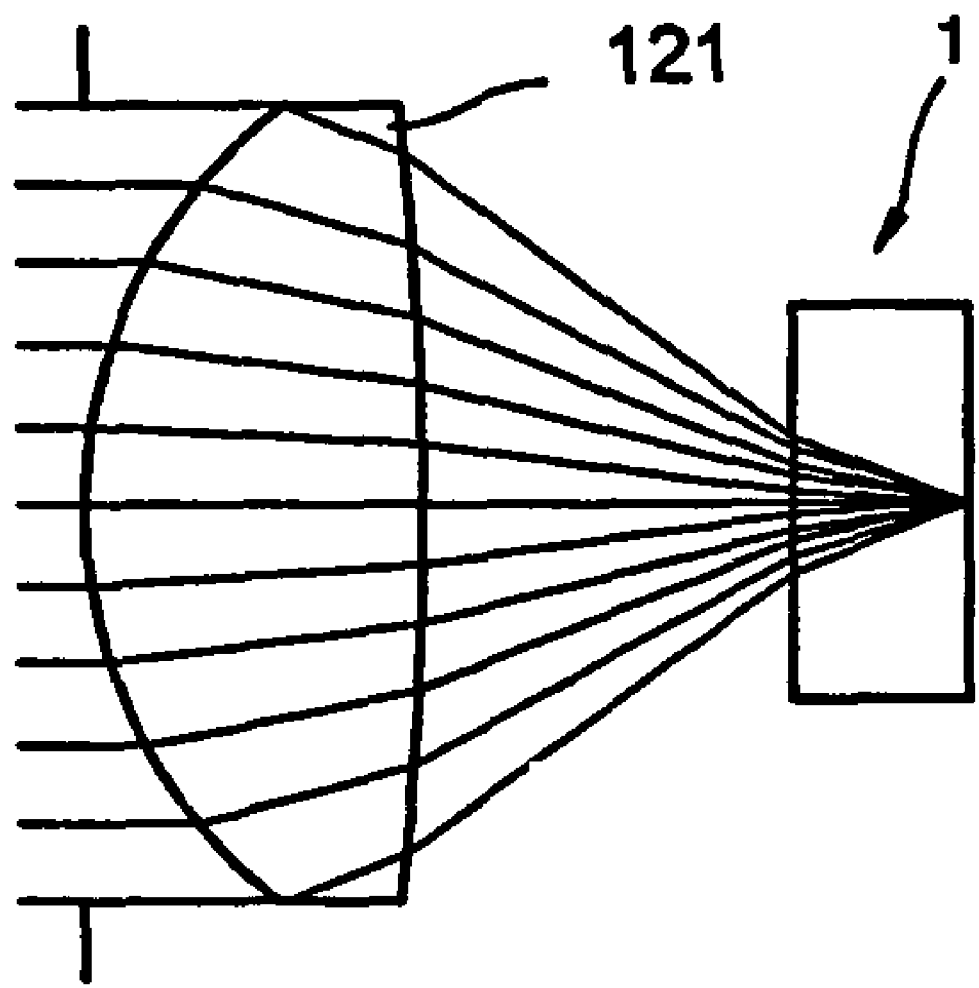
FIG. 19 shows light paths formed by a lens according to a first embodiment of the present invention which has the design data of Table 2.

However, the wavefront error occurring mainly due to the tilt of a lens can be corrected by using a lens 121 according to a first embodiment of the present invention which is designed using design data shown in Table 2 and produces light paths of FIG. 19.

Table 1 shows the design data of the lens according to an embodiment of the present invention and usable with the first embodiment of the present invention, and FIG. 19 shows light paths formed by the lens according to the first embodiment of the present invention which is designed using the design data of Table 2. Table 2 shows the lens according to the first embodiment of the present invention which is designed to have a 0.60 NA and a 2.33 mm focal length with respect to light with a 650 nm wavelength as a conventional DVD objective lens.

TABLE 2

| Surface | Radius of curvature (mm) | Thickness/interval (mm) | Material (glass) |
|---|---|---|---|
| Object surface | INFINITY | INFINITY | |
| S1 (STOP) | INFINITY | 0.000000 | |
| S2 (aspheric surface 1) | 1.586692 K: −1.050762 A: 0.179839E−01 B: 0.168845E−02 C: −.855002E−03 D: 0.459887E−03 E, F, G, H, J: 0.000000E+00 | 1.200000 | BaCD5_HOYA |
| S3 (aspheric surface 2) | −7.088948 K: −50.444343 A: 0.134310E−01 B: −.858406E−02 C: 0.475662E−02 D: −.912611E−03 E, F, G, H, J: 0.000000E+00 | 0.000000 | |
| S4 | INFINITY | 1.299557 | |
| S5 | INFINITY | 0.600000 | 'CG' |
| S6 | INFINITY | 0.000000 | |
| Image surface | INFINITY | 0.000000 | |

Figure 20A:
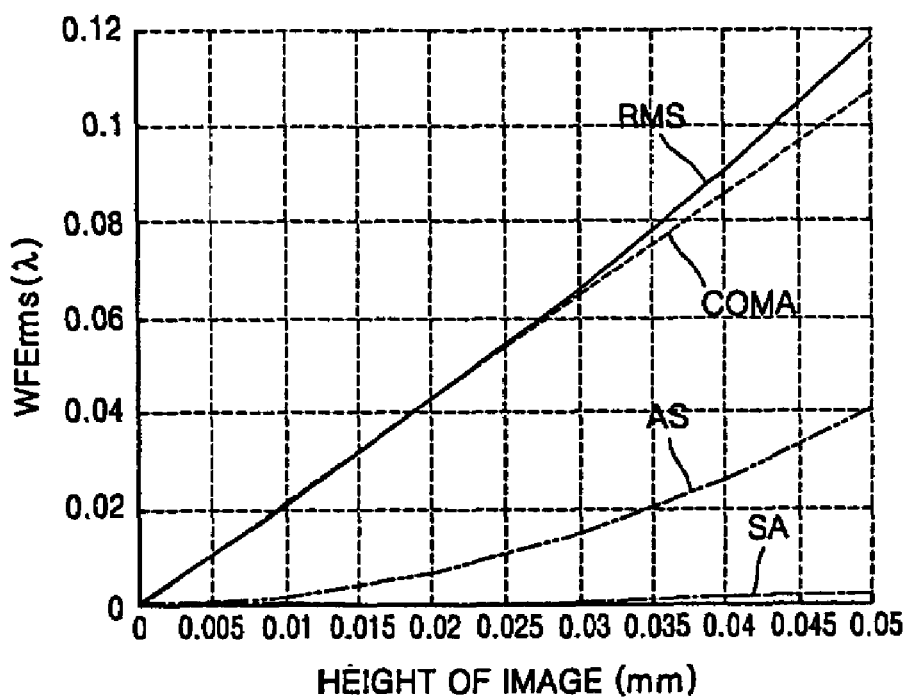
FIGS. 20A and 20B show a wavefront error feature with respect to a variation of the height of an image on an image surface according to a variation of the angle of light incident upon the lens according to the first embodiment of the present invention having the design data of Table 2, and a wavefront error feature with respect to the tilt of the lens, respectively.

FIG. 19 shows light paths obtained by the lens 121 according to an embodiment of the present invention and usable with the first embodiment of the present invention designed using the design data of Table 2. As shown in Table 2, the lens according to the first embodiment of the present invention includes two aspheric lens surfaces. The lens 121 according to the first embodiment of the present invention, which is designed using the design data of Table 2 and produces the light paths of FIG. 19, has a wavefront error as shown in FIG. 20A with respect to the height of an image on the image surface of the lens 121, the height varying according to a light incidence angle. Also, the lens 121 has a wavefront error as shown in FIG. 20B with respect to the tilt of the lens 121.

Figure 20B:
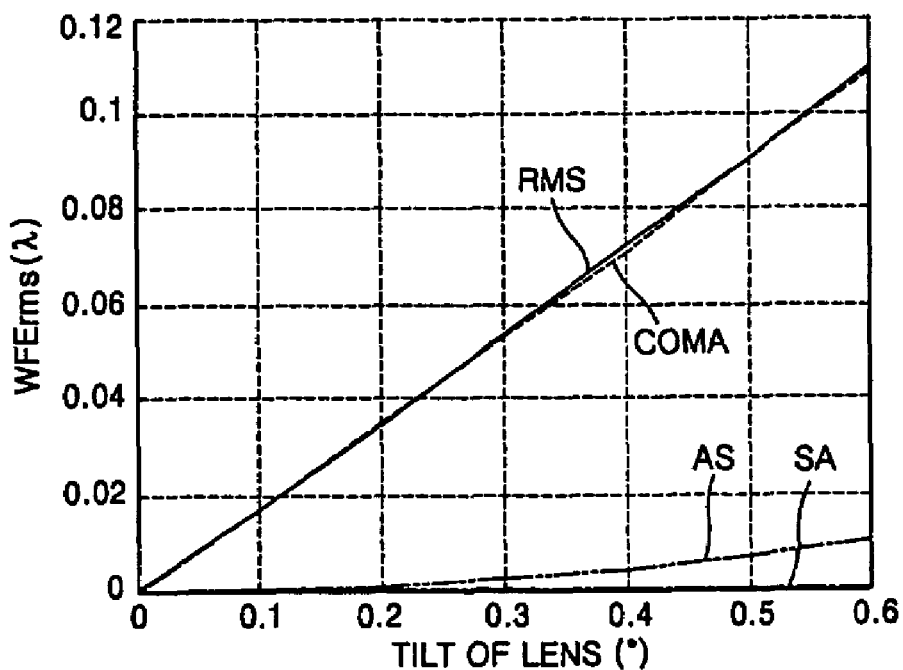

As can be seen from FIGS. 20A and 20B, in the lens 121 according to an embodiment of the present invention and usable with the first embodiment of the present invention, coma aberration mainly occurs with respect to a variation of the height of an image on an image surface, and coma aberration also mainly occurs with respect to a variation of the tilt of the lens 121. Hence, in an optical pickup using the lens 121 according to the first embodiment of the present invention, a wavefront error caused by the tilt of the lens 121 can be erased or reduced by adjusting the angle at which light is incident upon the lens 121 so that the coma aberration occurs in the direction opposite to the coma aberration due to the lens tilt occurs. The successful wavefront error correction can be checked as shown by the aberration diagrams of FIGS. 21A and 21B.

In the optical pickup of FIG. 2, when the lens 121 according to an embodiment of the present invention and usable with the first embodiment of the present invention is used as the second objective lens 41 for the DVD 1b/CD 1c, and the first and second objective lens 45 and 41 are installed on the lens holder 50 of the actuator 40 so that the second objective lens 41 is tilted by 0.5 degrees against the first objective lens 45 for high-density optical discs, if the optical pickup according to the first embodiment of the present invention or the actuator 40 is skewed so as to be optimized for the next-generation DVD 1a, the second objective lens 41 is tilted 0.5 degrees against the DVD 1b. in this case, the second objective lens 41, which is the lens according to an embodiment of the present invention and usable with the first embodiment of the present invention, generates a wavefront error of, for example, 0.0890 λrms with respect to the DVD 1b.

If a light source, that is, the second optical unit 20 of FIG. 2, is moved within a plane perpendicular to the proceeding direction of light so that the optical axis of the second beam 21a incident upon the second objective lens 41 is tilted 0.98 degrees, the wavefront error occurring in the second objective lens 41 is greatly reduced to 0.0110 λrms. This is because the correction of the wavefront error can be performed in the direction of reducing the coma aberration or astigmatism because the lens according to an embodiment of the present invention and usable with the first embodiment of the present invention is formed so that a main aberration occurring due to the lens tilt is the same as a main aberration occurring due to field characteristics.

Figure 21A:
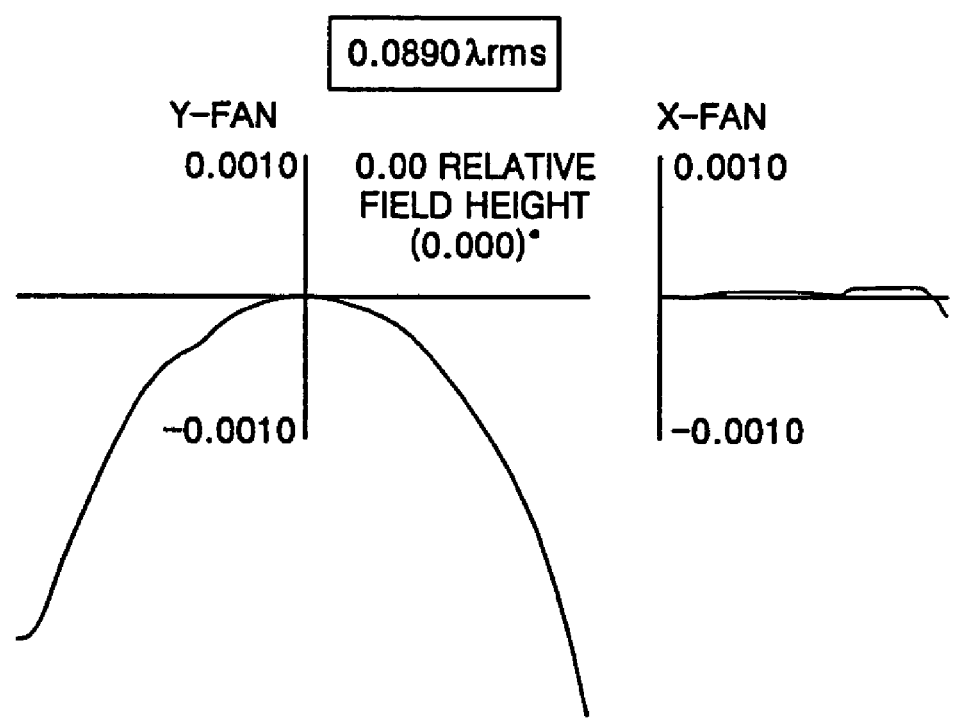
FIG. 21A is a diagram of an aberration when a wavefront error of 0.0890 λrms appears in the lens usable in the first embodiment of the present invention.
Figure 21B:
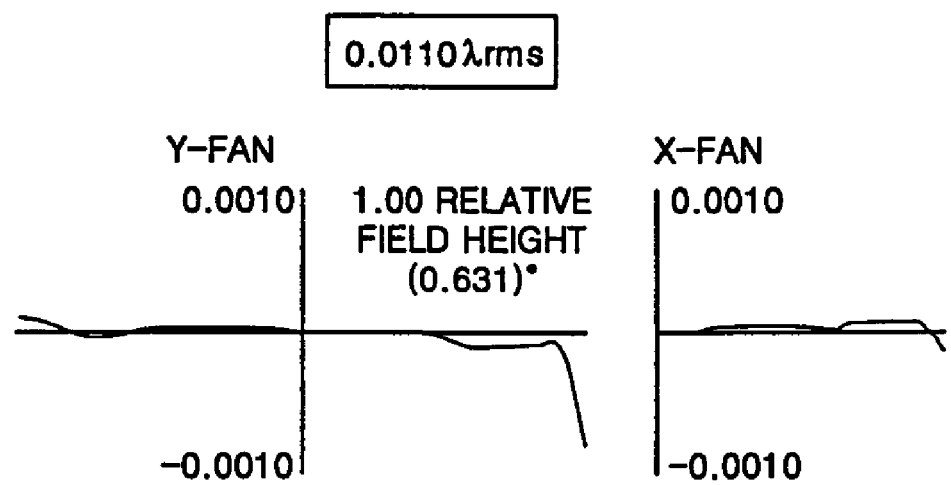
FIG. 21B is a diagram of an aberration when a wavefront error of 0.0110 λrms appears in the lens usable in the first embodiment of the present invention.

FIG. 21A shows an aberration diagram when a wavefront error of 0.0890 λrms occurs, and FIG. 21B shows an aberration diagram when a wavefront error of 0.0110 λrms occurs. As shown in FIGS. 21A and 21B, in the lens according to an embodiment of the present invention and usable with the first embodiment of the present invention, a wavefront error caused by the tilt of a lens can be corrected by adjusting the angle at which light is incident upon the lens.

Figure 22:
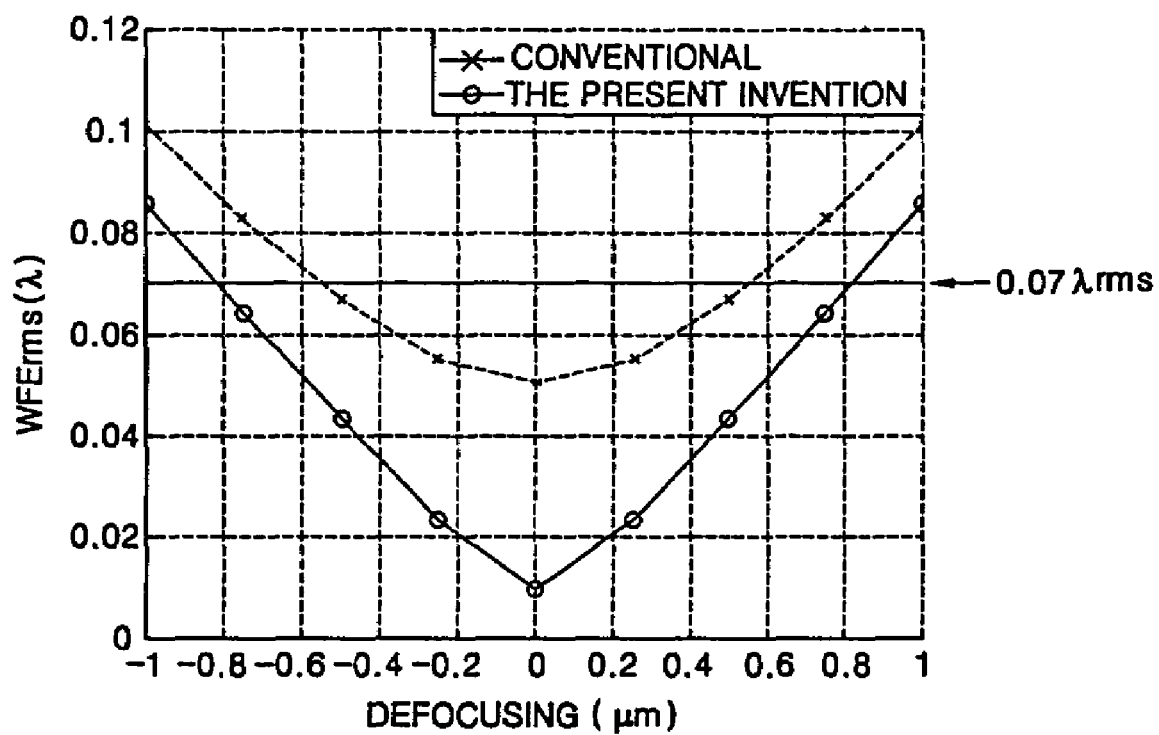
FIG. 22 is a graph showing that the performance margin of an optical system, e.g., an optical pickup, can be improved by reducing a wavefront error using a lens according to the present invention.

FIG. 22 shows that the performance margin of an optical system, e.g., an optical pickup, can be improved by reducing a wavefront error using a lens according to an embodiment of the present invention. In an optical pickup assembled using a conventional DVD objective lens, a large aberration of 0.0498 λrms still remains even though the wavefront error due to the tilt of the objective lens is corrected. Since a Marechal criterion allowed by an optical system typically used in an optical pickup is 0.070 λrms, an allowance is small, that is, ±0.55 μm. Hence, the performance of an optical pickup using a conventional DVD objective lens can be degraded according to the defocusing of the conventional DVD objective lens.

However, in an optical pickup according to the first embodiment of the present invention assembled with 0.0110 λrms using the lens according to an embodiment as the second objective lens 41, an allowance is extended to ±0.8 μm. Hence, the performance margin of the optical pickup can be greatly increased, and accordingly, degradation of the performance with respect to the defocusing of the objective lens can be reduced.

As described above, the lens according to an embodiment of the present invention includes two aspheric surfaces and is designed so as to be optimized for 0.6 mm-thick optical discs, objective lenses with a 0.6 NA, and light with a 650 nm wavelength. Accordingly, the lens according to an embodiment of the present invention and usable with the first embodiment of the present invention can correct a wavefront error due to its tilt by adjusting the angle at which light is incident upon the lens. However, the lens according to an embodiment of the present invention can be designed into forms other than the above-described form.

If the lens according to an embodiment of the present invention and usable with the first embodiment of the present invention is used as the second objective lens 41, a wavefront error generated when the second objective lens 41 is tilted against the DVD 1b can be corrected. Similarly, if the lens according to an embodiment of the present invention is optimized for the CD 1c and used as the second objective lens 41, a wavefront error generated when the second objective lens 41 is tilted against the CD 1c can be corrected.

Table 3 shows the design data of a conventional diffractive type DVD/CD compatible objective lens, in which two lens surfaces are formed as aspheric surfaces and a hologram pattern is formed on a lens surface facing a light source. In Table 3, the conventional DVD/CD compatible objective lens is designed to have a 0.60 NA and a 2.33 mm focal length with respect to DVD light with a 650 nm wavelength and to have a 0.50 NA and a 2.35 mm focal length with respect to CD light with a 780 nm wavelength.

TABLE 3

| Surface | Radius of curvature (mm) | Thickness/interval (mm) | Material (glass) |
|---|---|---|---|
| Object surface | INFINITY | INFINITY | |
| S1 (STOP) | INFINITY | 0.000000 | |
| S2 (aspheric surface 1) | 1.489049 | 1.200000 | BaCD5_HOYA |
| | K: −6.2832E−01 | | |
| | A: −2.6445E−03 B: 7.7541E−04 C: 1.1013E−03 | | |
| | D: −8.4846E−04 | | |
| | E, F, G, H, J: 0.000000E+00 | | |
| | C1: 2.1692E−03 C2: −4.7550E−03 C3: −4.0057E−04 | | |
| | C4: −2.3991E−04 | | |
| S3 (aspheric surface 2) | −10.419496 | 0.000000 | |
| | K: 51.942613 | | |
| | A: 0.279262E−01 B: 0.963886E−02 | | |
| | C: −.122410E−01 D: 0.389081E−02 | | |
| | E, F, G, H, J: 0.000000E+00 | | |
| S4 | INFINITY | 1.263520 | |
| | | 0.89977 | |
| S5 | INFINITY | 0.600000 | 'CG' |
| | | 1.200000 | |
| S6 | INFINITY | 0.000000 | |
| Image surface | INFINITY | 0.000000 | |

In Table 3, and Table 4 to be described later, two upper and lower values representing the interval or thickness between the surface S4 or S5 and the next surface correspond to values for DVDs and CDs, respectively.

Also, the lens surface S2 facing the object surface is an aspheric lens surface on which a hologram pattern is formed, and C1, C2, C3, and C4 denote coefficients which represent power. When the phase coefficient of the hologram is expressed as a rotationally symmetric form, it can be expressed as Equation 5:

$$\Phi = \frac{2\pi}{\lambda_0} \sum_n C_n r^{2n} \quad (5)$$

wherein Φ denotes a phase difference, $C_n$ denotes a power coefficient, and r denotes a polar coordinate. The surface S2 is an aspheric surface on which a hologram pattern is formed, and Table 3 shows design data used to design the conventional DVD/CD compatible objective lens so that a hologram pattern is formed on a lens surface facing an object surface. The surface S2 on which a hologram pattern is formed using the design data of Table 3 diffracts light in a first order.

In a conventional first-order diffractive DVD/CD objective lens, in which two aspheric lens surfaces are formed and a hologram pattern is formed on a lens surface facing an object surface using the design data of Table 3, a wavefront error with respect to the height of an image and a wavefront error with respect to the tilt of the objective lens are shown in FIGS. 23A and 23B and FIGS. 24A and 24B.

Figure 23A:
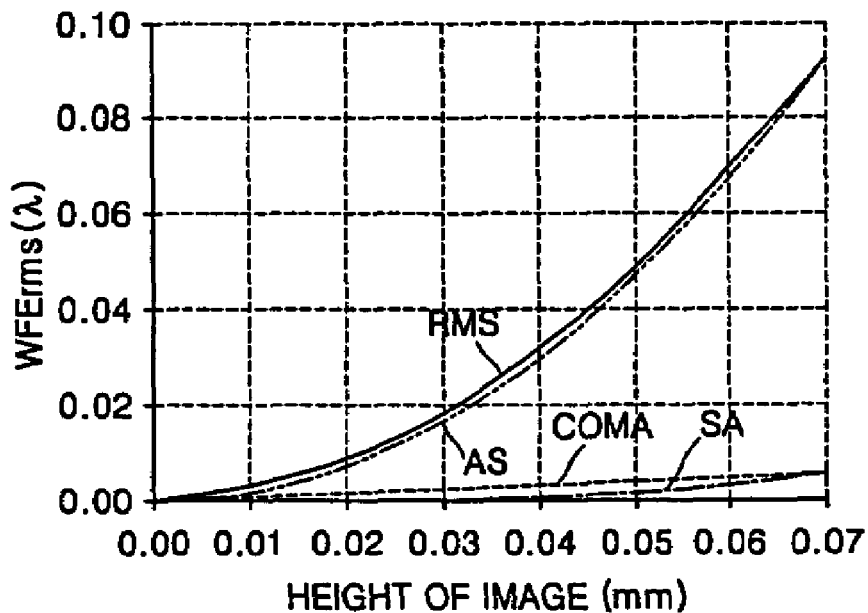
FIGS. 23A and 23B are graphs showing a wavefront error with respect to a variation of the height of an image in a conventional diffractive type DVD/CD objective lens and a wavefront error with respect to the tilt of the conventional objective lens, respectively, with respect to a DVD (a 650 nm wavelength, a 0.6 NA, and a 0.6 mm thickness)
Figure 23B:
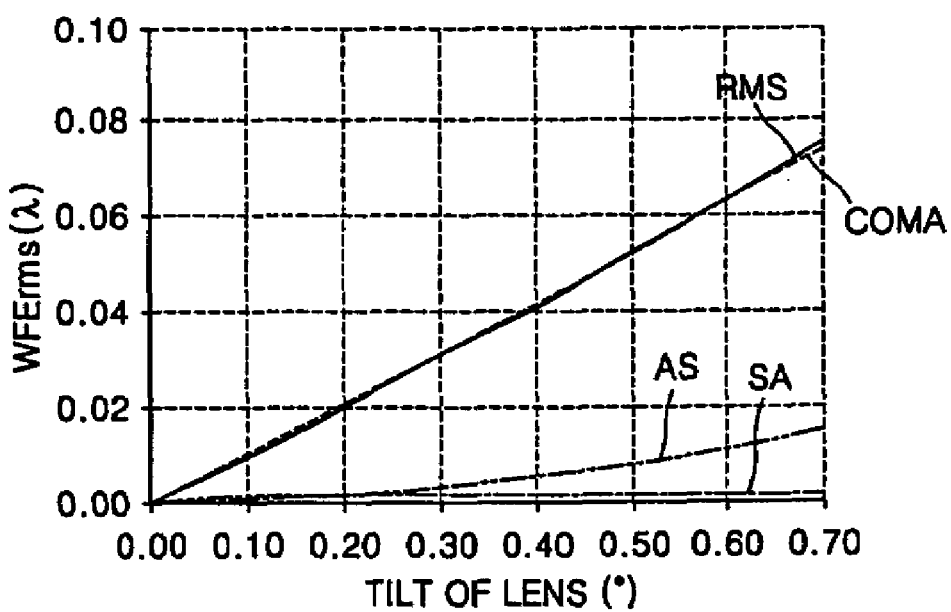

FIGS. 23A and 23B are graphs showing a wavefront error with respect to the height of an image in a conventional diffractive DVD/CD objective lens and a wavefront error with respect to the tilt of the objective lens, respectively, with respect to a DVD (light of a 650 nm wavelength, a 0.6 NA, and a 0.6 mm thickness).

Figure 24A:
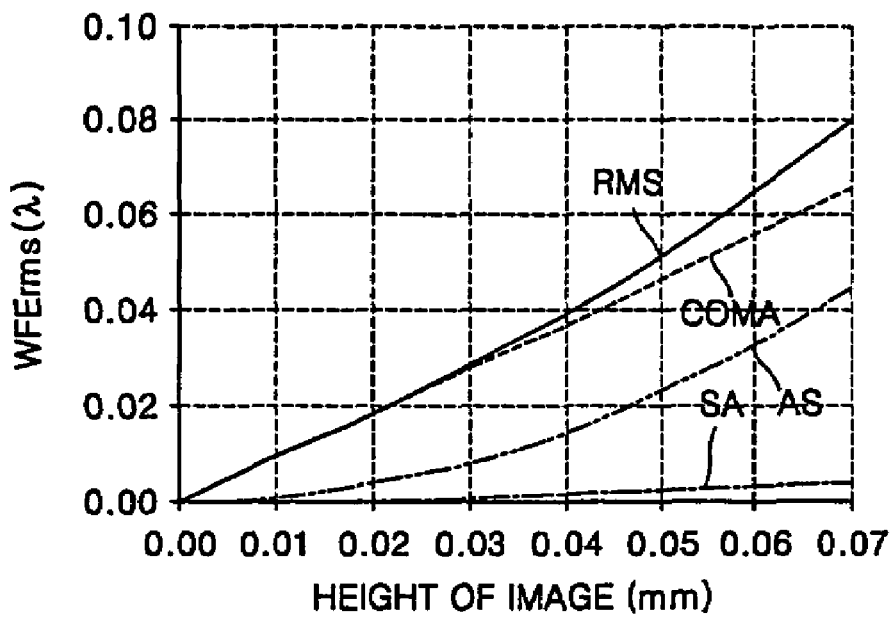
FIGS. 24A and 24B are graphs showing a wavefront error with respect to a variation of the height of an image in the conventional diffractive type DVD/CD objective lens and a wavefront error with respect to the tilt of the conventional objective lens, respectively, with respect to a CD (a 780 nm wavelength, a 0.5 NA, and a 1.2 mm thickness)
Figure 24B:
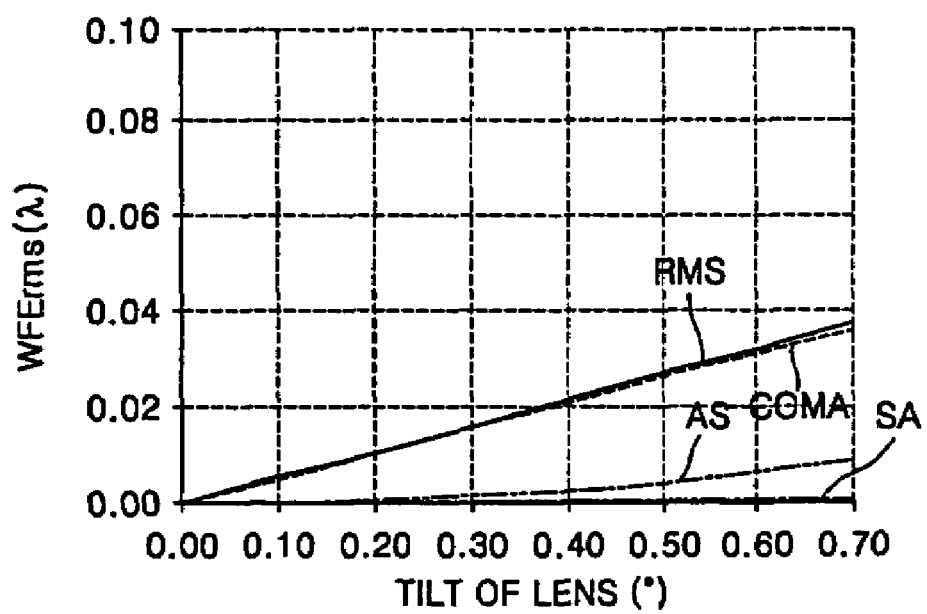

FIGS. 24A and 24B are graphs showing a wavefront error with respect to the height of an image in the conventional diffractive DVD/CD objective lens and a wavefront error with respect to the tilt of the objective lens, respectively, with respect to a CD (light of a 780 nm wavelength, a 0.5 NA, and a 1.2 mm thickness).

As shown in FIGS. 23A and 23B, in the conventional diffractive DVD/CD objective lens, astigmatism is mainly generated with respect to a variation in the height of an image, whereas a coma aberration is mainly generated with respect to a variation in the tilt of the objective lens. Hence, when a DVD is processed, the wavefront error due to the tilt of an objective lens cannot be properly corrected.

As shown in FIGS. 24A and 24B, when a CD is processed, a coma aberration is mainly generated with respect to both a variation in the image height and the tilt of the diffractive DVD/CD objective lens. Hence, the coma aberration due to the tilt of a lens can be corrected by moving a light source for CDs within a plane perpendicular to the optical axis to change the angle at which light with a 780 nm wavelength is incident upon the conventional diffractive DVD/CD objective lens.

Table 4 shows the design data used to design a diffractive DVD/CD compatible objective lens according to a second embodiment of the present invention so that a hologram pattern is formed on a lens surface facing a light source. Similar to the conventional DVD/CD objective lens designed using the design data of Table 3, the diffractive DVD/CD compatible objective lens of the present invention is designed to have a 0.60 NA and a 2.33 mm focal length with respect to DVD light with a 650 nm wavelength and to have a 0.50 NA and a 2.35 mm focal length with respect to CD light with a 780 nm wavelength.

TABLE 4

| Surface | Radius of curvature (mm) | Thickness/interval (mm) | Material (glass) |
|---|---|---|---|
| Object surface | INFINITY | INFINITY | |
| S1 (STOP) | INFINITY | 0.000000 | |
| S2 (aspheric surface 1) | 1.510297 K: −1.0985E+00 A: 1.5027E−02 B: 4.6399E−04 C: −5.0007E−04 D: −1.0158E−04 E, F, G, H, J: 0.000000E+00 C1: 2.2030E−03 C2: −4.6825E−03 C3: −4.9820E−04 C4: −1.4118E−04 C5: −1.6806E−05 | 1.200000 | BaCD5_HOYA |
| S3 (aspheric surface 2) | −9.184683 K: −5.632838 A: 0.273541E−01 B: −.132079E−01 C: 0.400124E−02 D: −.554176E−03 E, F, G, H, J: 0.000000E+00 | 0.000000 | |

TABLE 4-continued

| Surface | Radius of curvature (mm) | Thickness/interval (mm) | Material (glass) |
|---|---|---|---|
| S4 | INFINITY | 1.27366 0.91002 | |
| S5 | INFINITY | 0.600000 1.200000 | 'CG' |
| S6 | INFINITY | 0.000000 | |
| Image surface | INFINITY | 0.000000 | |

In Table 4, the lens surface S2 facing the object surface is an aspheric lens surface on which a hologram pattern is formed, and C1, C2, C3, C4, and C5 denote coefficients which represent power. Similar to the conventional diffractive DVD/CD objective lens having the design data of Table 3, a diffractive lens according to the present invention is designed with reference to Table 4 so that a hologram pattern is formed on a lens surface facing an object surface.

In a first-order diffractive lens according to an embodiment of the present invention, in which two aspheric lens surfaces are formed and a hologram pattern is formed on a lens surface facing an object surface using the design data of Table 4, a wavefront error with respect to a variation in the height of an image and a wavefront error with respect to the tilt of the lens are shown in FIGS. 25A and 25B and FIGS. 26A and 26B.

Figure 25A:
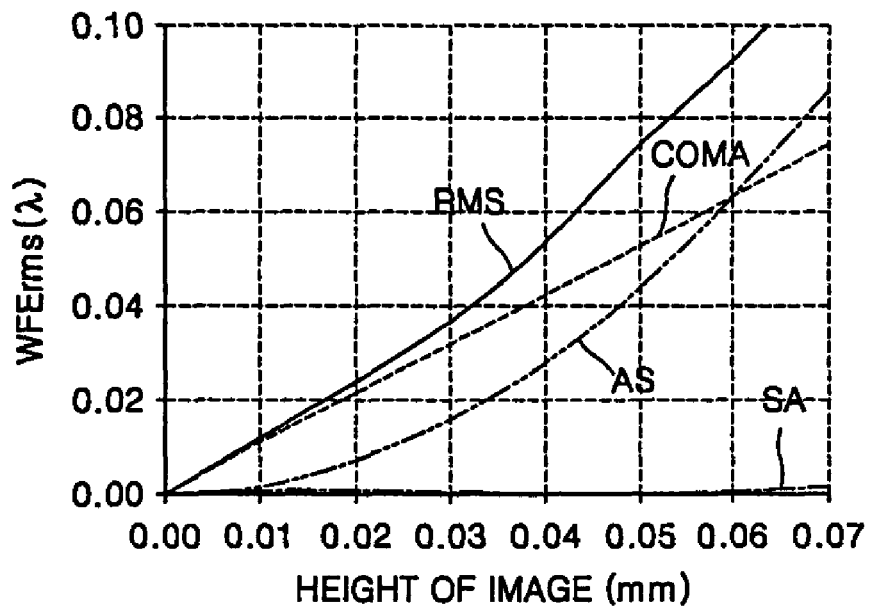
FIGS. 25A and 25B are graphs showing a wavefront error with respect to a variation of the height of an image in a diffractive lens according to an embodiment of the present invention and a wavefront error with respect to the tilt of the diffractive lens according to the present invention, respectively, with respect to a DVD (a 650 nm wavelength, a 0.6 NA, and a 0.6 mm thickness)
Figure 25B:
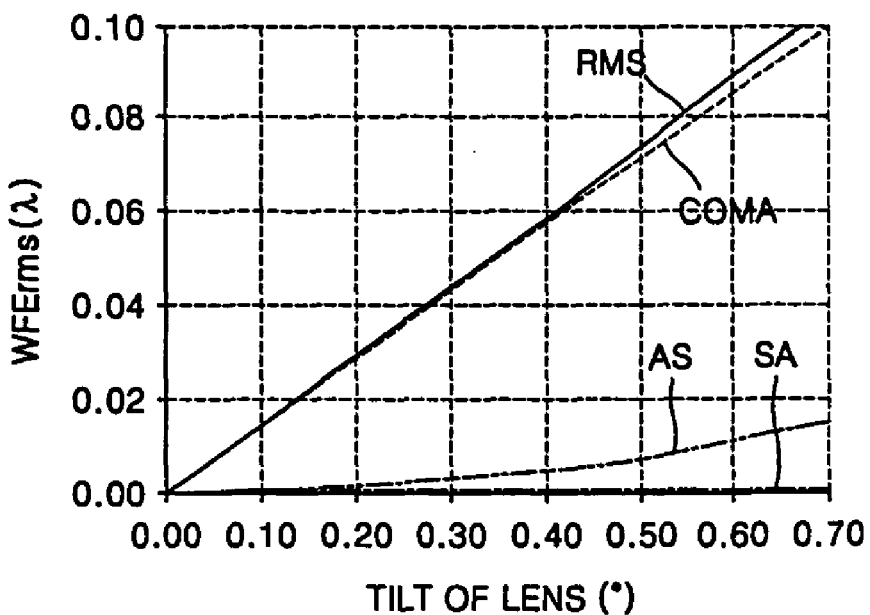

FIGS. 25A and 25B are graphs showing a wavefront error with respect to the height of an image in a diffractive lens according to an embodiment of the present invention and a wavefront error with respect to the tilt of the diffractive lens, with respect to a DVD (light of a 650 nm wavelength, a 0.6 NA, and an optical disc with a 0.6 mm thickness).

Figure 26A:
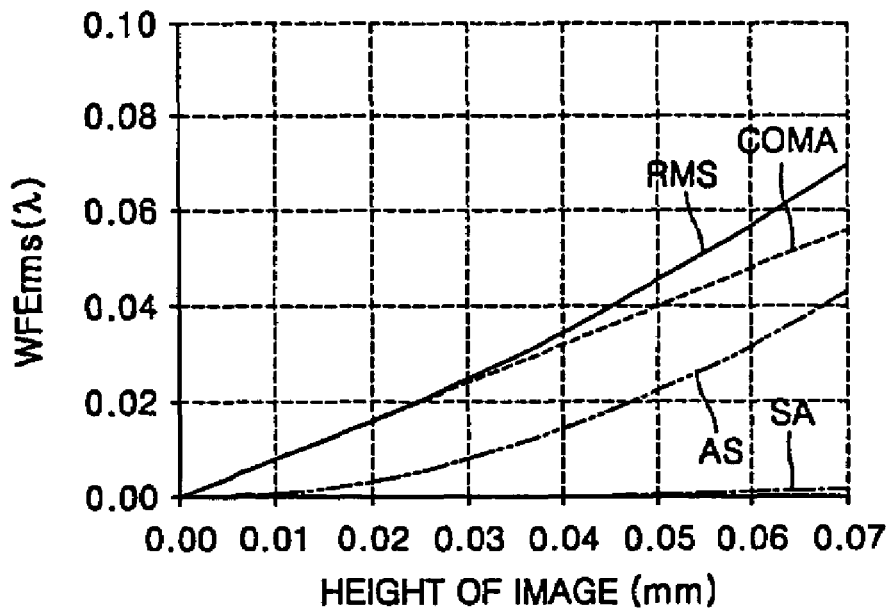
FIGS. 26A and 26B are graphs showing a wavefront error with respect to a variation of the height of an image in the diffractive lens according to an embodiment of the present invention and a wavefront error with respect to the tilt of the diffractive lens according to the present invention, respectively, with respect to a CD (a 780 nm wavelength, a 0.5 NA, and a 1.2 mm thickness)
Figure 26B:
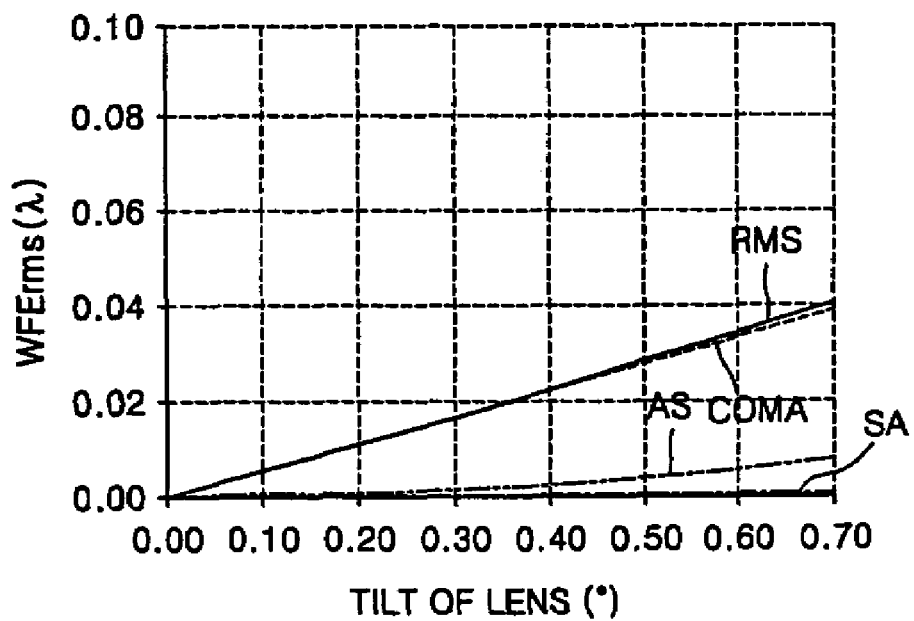

FIGS. 26A and 26B are graphs showing a wavefront error with respect to the height of an image in the diffractive lens according to an embodiment of the present invention and usable with the first embodiment of the present invention and a wavefront error with respect to the tilt of the diffractive lens, with respect to a CD (light of a 780 nm wavelength, a 0.5 NA, and an optical disc with a 1.2 mm thickness).

As shown in FIGS. 25A and 25B, in the diffractive lens according to an embodiment of the present invention, a coma aberration is mainly generated with respect to a variation in the height of an image, and a coma aberration is also mainly generated with respect to the tilt of the lens. Hence, the wavefront error due to the tilt of a lens can be removed or reduced by adjusting the angle of light incident upon the diffractive lens so that a coma aberration is generated in the direction opposite to the coma aberration due to the tilt of the lens.

As shown in FIGS. 26A and 26B, when a CD is processed, a coma aberration is mainly generated with respect to both a variation in the image height and the tilt of the lens. Hence, the coma aberration due to the tilt of the lens can be corrected by controlling the angle at which light with a 780 nm wavelength is incident upon the diffractive lens.

In the optical pickup of FIG. 2, when the second objective lens 41 for the DVD 1b and/or the CD 1c is mounted on the lens holder 50 of the actuator 40 so as to be tilted 0.5 degrees against the optical axis of the first objective lens 45 for the next-generation DVD 1a, and the diffractive lens according to an embodiment of the present invention and usable with the second embodiment of the present invention or the conventional diffractive DVD/CD objective lens are used as the second objective lens 41 for the DVD 1b and/or the CD 1c, a wavefront error that occurs due to the tilt of the lens and is not corrected and a wavefront error that occurs due to the tilt of the lens and is corrected by optimally adjusting the height of an image on an image surface, that is, adjusting the angle at which light is incident upon an objective lens, are shown in Table 5. In Table 5, Yim denotes the height of an image on the image surface.

TABLE 5

|  | Adopted lens | DVD | CD |
|---|---|---|---|
| When Yim is 0 | Conventional lens (Table 3) | 0.0525 λ rms | 0.0273 λ rms |
|  | Lens according to the present invention (Table 4) | 0.0740 λ rms | 0.0296 λ rms |
| When Yim is optimized | Conventional lens (Table 3) | When Yim is 0.005 mm, 0.0512 λ rms | When Yim is 0.02 mm, 0.0176 λ rms |
|  | Lens according to the present invention (Table 4) | When Yim is 0.05 mm, 0.0235 λ rms | When Yim is 0.015 mm, 0.0221 λ rms |

As shown in Table 5, in contrast with when the conventional diffractive DVD/CD objective lens is adopted, when the diffractive lens according to an embodiment of the present invention and usable with the second embodiment of the present invention is used as the second objective lens 41, the value of a wavefront error generated when the DVD 1b is processed is reduced from 0.0512 λrms to 0.0235 λrms. Accordingly, the aberration performance for the DVD 1b is improved by about 50%. On the other hand, the value of a wavefront error generated when the CD 1c is processed slightly increases from 0.0176 λrms to 0.0221 λrms, and accordingly, the performance deteriorates about 25%. However, because an objective lens has a small NA for the CD 1c, the degradation of the wavefront error as above does not cause a big problem in using the CD 1c.

Also, as shown in Table 5, when the conventional diffractive DVD/CD objective lens is used, even if the height of an image on an image surface is optimized for the DVD 1b, the wavefront error is hardly reduced. In other words, in conventional diffractive DVD/CD objective lenses, the wavefront error due to the lens tilt cannot be corrected even by varying the height of an image on an image surface by controlling the incidence angle of light.

As described above, if at least one objective lens in an optical pickup is a lens according to an embodiment of the present invention designed so that the type of a wavefront error mainly generated due to the tilt of a lens itself is the same as that of a wavefront error mainly generated when the angle at which light is incident upon the lens varies, even when the objective lens is tilted during the assembly of an optical pickup, a wavefront error due to the tilt of the objective lens can be corrected by adjusting the angle at which light is incident upon the objective lens.

As shown in FIGS. 23A, 23B, 25A, and 25B, when the main wavefront error generated due to the tilt of a lens according to an embodiment of the present invention the present invention and the main wavefront error generated when the angle at which light is incident upon the lens are the same as a coma aberration, the wavefront errors secondly generated in both cases are astigmatism. Thus, the wavefront errors can be effectively corrected.

In the optical pickup according to an embodiment of the present invention, the tilt between the first objective lens 45 for the next-generation DVD 1a and the optical disc 1 is prevented by skew control. The lenses according to the first and second embodiments of the present invention, which can correct a wavefront error due to the tilt of a lens, are used as the second objective lens 41 for the DVD 1b/CD 1c. Accordingly, if there is a relative tilt between the first and second objective lenses 45 and 41, degradation of the optical performance of an optical pickup due to the relative tilt can be prevented by controlling the angle at which the second beam 21a for DVDs and the third beam 31a for CDs are incident upon the second objective lens 41.

Alternatively, an optical pickup according to the present invention may have an optical structure in which the first and second objective lenses 45 and 41 can correct the wavefront error due to the lens tilt and the first objective lens 45 is designed in accordance with the format of next-generation DVDs, such that a skew controlling process can be omitted as desired.

In contrast with the above-described embodiments, an optical pickup according to the present invention may also have an optical structure in which the optical axis of the second objective lens 41 for the DVD 1b/CD 1c is adjusted by skew control, and the lens capable of correcting the wavefront error due to the lens tilt is used as the first objective lens 45 for the next-generation DVD 1a.

The optical pickup according to the first embodiment of the present invention includes 3 light sources and two objective lenses so that three types of optical discs with different recording densities, e.g., a CD, a DVD, and a next-generation DVD, are compatibly adopted and data is recorded and/or reproduced on an adopted optical disc. Alternatively, an optical pickup may include two objective lenses and two light sources such that two types of optical discs with different recording densities, for example, a DVD and a high-density optical disc, or a DVD and a CD, are compatibly adopted, and that data is recorded and/or reproduced on an adopted optical disc.

To be compatible with a DVD and a next-generation DVD, an optical pickup according to the present invention may have an optical structure in which an optical system for CDs, that is, the third optical unit 30 and the third collimating lens 33 of the optical pickup of FIG. 2, is omitted and a lens optimized for the format of a DVD is used as the second objective lens 41.

Figure 27:
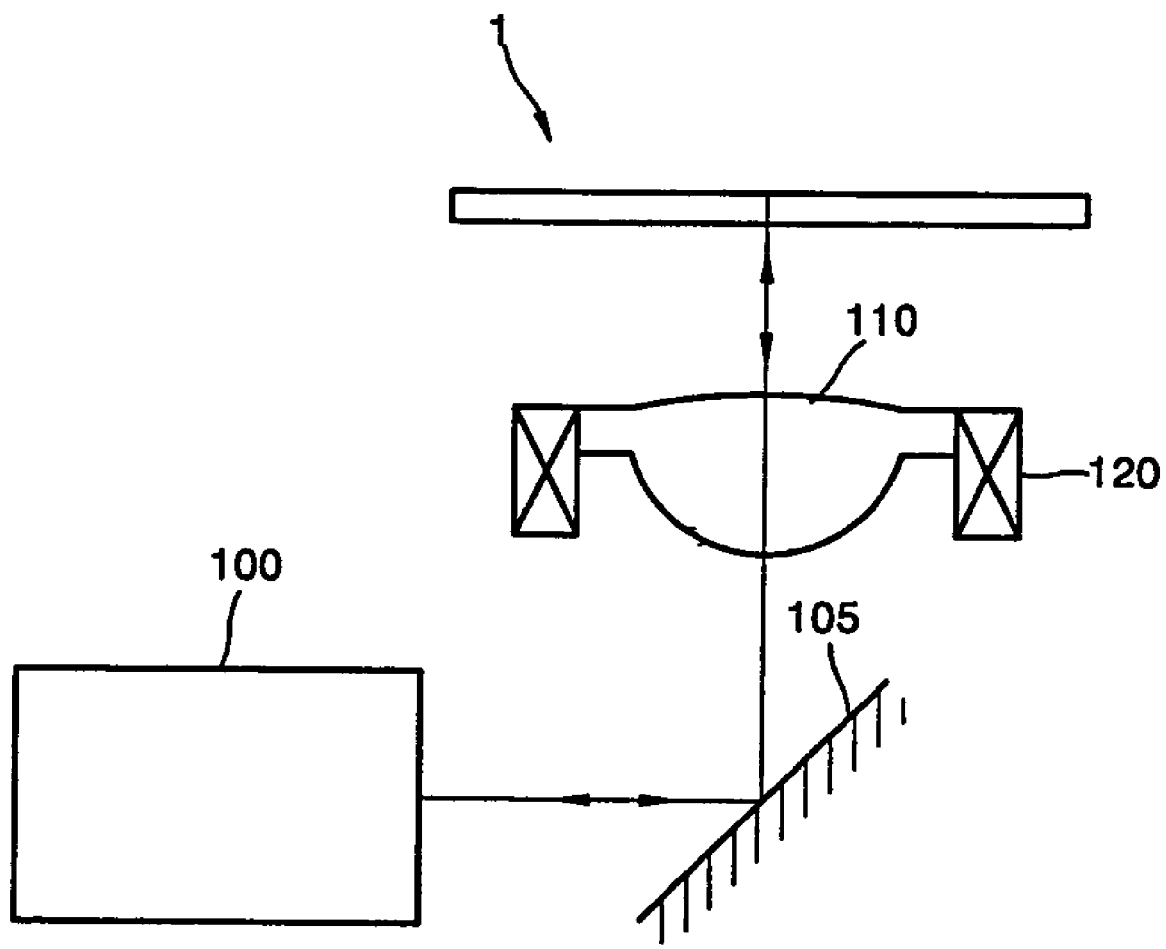
FIG. 27 is a schematic view of the optical structure of an optical pickup according to a second embodiment of the present invention.

As shown in FIG. 27, an optical pickup according to the second embodiment of the present invention may have an optical structure in which an optical unit 100 and a single objective lens 110 are included to use a single family of optical discs or to compatibly adopt a plurality of families of optical discs with different recording densities and record and/or reproduce data on an adopted optical disc. The single objective lens 110 is driven by an actuator 120. In FIG. 27, light emitted from the optical unit 100 is reflected by a reflection mirror 105 and then incident upon the single objective lens 110. However, the reflection mirror 105 may not be included in the optical pickup of FIG. 27.

The optical unit 100 includes a single light source to record and/or reproduce data on optical discs of a single family or includes at least two light sources to compatibly adopt a plurality of families of optical discs with different recording densities to record and/or reproduce data on them.

The single objective lens 110 is the lens according to the present invention which is described using the design data of each of Tables 2 and 4 so as to correct a wavefront error caused by the lens tilt.

The designing conditions for the lens used in the single objective lens 110 are changed in accordance with a desired optical structure of an optical pickup according to the present invention.

The above-described lens according to an embodiment of the present invention is designed so that the wavefront error due to the lens tilt can be corrected by adjusting the angle at which light is incident upon the lens.

Accordingly, when the lens according to an embodiment of the present invention is used as at least one objective lens included in an optical pickup, a wavefront error due to the tilt of the objective lens can be corrected by adjusting the angle at which light is incident upon the objective lens.

Hence, in an optical pickup including a single and/or a plurality of objective lenses, degradation of a reproduction signal due to the tilt of the objective lens can be prevented.

Also, when a plurality of objective lenses are installed in consideration of the difference between working distances required by a plurality of families of optical information storage media with different recording densities, an objective lens having a shorter working distance can be prevented from colliding with an optical disc.

Furthermore, when a plurality of objective lenses are mounted on a single lens holder in an optical pickup according to the present invention, the optical pickup includes an actuator having two separate magnetic circuits, one for driving the objective lenses in a focusing direction and the other one for driving the objective lenses in a tracking direction. Thus, the weight of a moving part can be reduced.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

What is claimed is:

1. An optical pickup comprising:
a first objective lens to form an optical spot of a light beam used to record and/or reproduce data on a first recording medium;
a second objective lens to form an optical spot of a light beam used to record and/or reproduce data on a second recording medium;
a first light source emit a light beam having a wavelength suitable for the high-density recording medium; and
at least one second light source to emit a light beam with a wavelength suitable for the low-density recording medium, wherein the first objective lens has a working distance WD1 indicating a distance from the first objective lens to the high-density recording medium at a desired focus, the second objective lens has a working distance WD2 indicating a distance from the second objective lens to the low-density recording medium at a desired focus which is longer than WD1, and the first and second obiective lenses are provided so that a distance D between the first objective lens and the high-density recording medium or the low-density recording medium satisfies the following expression:

$D=WD1+\alpha$ and $\alpha=|WD2-WD1|\times(0.1\text{-}1.0)$, wherein at least one of the plurality of objective lenses is configured so that a type of wavefront error mainly generated by a tilt of the at least one of the plurality of objective lenses is the same as a type of a wavefront error mainly generated by an angle at which light is incident upon the at least one of the plurality of objective lenses.

2. The optical pickup of claim 1, wherein the first objective lens is located closer to an inside diameter of one of the recording media than the second objective lens.

3. The optical pickup of claim 2, wherein the first and second objective lenses are disposed along a radial direction of one of the recording media.

4. The optical pickup of claim 1, further comprising an actuator section including a single lens holder on which the objective lenses are mounted and a magnetic circuit which drives the lens holder.

5. The optical pickup of claim 4, wherein the actuator section comprises one of a two axial driving device and a three axial driving device.

6. The optical pickup of claim 5, wherein the two axial driving device includes a moving part on which the first and second objective lenses are mounted and is independently movable in an axial direction and in a radial direction with respect to the one of the recording media.

7. The optical pickup of claim 5, wherein the three axial driving device includes a moving part on which the first and second objective lenses are mounted, is independently movable in an axial direction and in a radial direction with respect to the one of the recording media, and controls a tilt of the moving part.

8. The optical pickup of claim 4, wherein the actuator section comprises a single actuator in which the first and second objective lenses are mounted.

9. The optical pickup of claim 4, wherein the actuator section comprises first and second actuators which independently drive the first and second objective lenses and to which the first and second objective lenses are mounted, respectively.

10. The optical pickup of claim 1, wherein the first objective lens is located closer to an inside diameter of the one of the recording media than the second objective lens.

11. The optical pickup of claim 10, wherein the first and second objective lenses are disposed in a radial direction of the one of the recording media.

12. The optical pickup of claim 1, further comprising an actuator section, the actuator section including a single lens holder on which the objective lenses are mounted and a magnetic circuit driving the lens holder.

13. The optical pickup of claim 12, wherein the actuator section comprises one of a two axial driving device and a three axial driving device.

14. The optical pickup of claim 13, wherein the two axial driving device includes a moving part on which the first and second objective lenses are mounted and is independently movable in an axial direction and in a radial direction with respect to the one of the recording media.

15. The optical pickup of claim 13, wherein the three axial driving device includes a moving part on which the first and second objective lenses are mounted, is independently movable in an axial direction and in a radial direction with respect to the one of the recording media, and controls a tilt of the moving part.

16. The optical pickup of claim 12, wherein the actuator section comprises a single actuator in which the first and second objective lenses are mounted.

17. The optical pickup of claim 12, wherein the actuator section comprises first and second actuators independently drive the first and second objective lenses, to which the first and second objective lenses are mounted, respectively.

18. The optical pickup of claim 1, wherein the high-density recording medium is a next-generation DVD which has a higher density than a DVD, and the light source for the high-density recording medium emits a light beam in a blue-violet wavelength range suitable for the next-generation DVD.

19. The optical pickup of claim 18, wherein the high-density recording medium has a thickness of about 0.1 mm, and the first objective lens has a numerical aperture of 0.85 or greater.

20. The optical pickup of claim 18, wherein the low-density recording medium is one of a DVD and a CD, and the light source for the low-density recording medium is at least one of a DVD light source which emits a light beam in a red wavelength range suitable for DVDs and a CD light source which emits a light beam in an infrared wavelength range suitable for CDs.

21. The optical pickup of claim 20, wherein the second objective lens is configured so that a type of wavefront error mainly generated by a tilt of the second objective lens is the same as a type of wavefront error mainly generated by an angle at which light is incident upon the second objective lens.

22. The optical pickup of claim 21, wherein the second objective lens is configured so that both the wavefront error mainly generated by the tilt of the second objective lens and the wavefront error mainly generated by the angle at which light is incident upon the second objective lens are coma aberrations.

23. The optical pickup of claim 21, wherein, when light beams emitted from the DVD light source and the CD light source are used, the second objective lens is configured so as to satisfy an optical performance criteria for each of the DVD and the CD.

24. The optical pickup of claim 21, wherein, when light beams emitted from the DVD light source and the CD light source are used, a hologram pattern is formed on the second objective lens so as to satisfy an optical performance criteria for each of a the DVD and the CD.

25. The optical pickup of claim 1, wherein at least one of first and second objective lenses is configured so that both the wavefront error mainly generated by the tilt of the objective lens and the wavefront error mainly generated by an angle at which light is incident upon the objective lens are coma aberrations.

26. The optical pickup of claim 1, further including an actuator section including a single lens holder on which the objective lenses are mounted and a magnetic circuit driving the lens holder.

27. The optical pickup of claim 26, wherein the actuator section comprises one of a two axial driving device and a three axial driving device.

28. The optical pickup of claim 27, wherein the two axial driving device includes a moving part on which the first and second objective lenses are mounted and is independently movable in an axial direction and in a radial direction with respect to the one of the recording media.

29. The optical pickup of claim 27, wherein the three axial driving device includes a moving part on which the first and second objective lenses are mounted, is independently movable in an axial direction and in a radial direction with respect to the one of the recording media, and controls a tilt of the moving part.

30. The optical pickup of claim 26, wherein the actuator section comprises a single actuator in which the first and second objective lenses are mounted.

31. The optical pickup of claim 26, wherein the actuator section comprises first and second actuators to independently drive the first and second objective lenses, to which the first and second objective lenses are mounted, respectively.

32. The optical pickup of claim 26, wherein the magnetic circuit comprises first and second magnetic circuits, the first magnetic circuit driving the objective lenses in a focusing direction and the second magnetic circuit driving the objective lenses in a tracking direction.

33. The optical pickup of claim 32, wherein the first and second magnetic circuits are provided on a same side of the lens holder.

34. The optical pickup of claim 32, wherein the first magnetic circuit includes a focusing coil and a focusing magnet.

35. The optical pickup of claim 34, wherein the focusing coil is provided on both side surfaces of the lens holder in a radial direction, and the focusing magnet faces the focusing coil.

36. The optical pickup of claim 34, wherein the focusing magnet is a two-pole magnetized polarization magnet, the focusing coil has a rectangular shape, and the longer sides of the focusing coil are put respectively disposed on N-pole and S-pole portions of the focusing magnet.

37. The optical pickup of claim 36, wherein, when a polarity and an amount of current applied to the focusing coil is altered, a position of the lens holder in the focusing direction is altered.

38. The optical pickup of claim 32, wherein the second magnetic circuit further comprises a tracking coil and a tracking magnet.

39. The optical pickup of claim 38, wherein the tracking coil is provided on both side surfaces of the lens holder in a radial direction, and the tracking magnet is provided so as to face the tracking coil.

40. The optical pickup of claim 39, wherein the tracking magnet is a two-pole magnetized polarization magnet, the tracking coil has a rectangular shape, and the longer sides of the tracking coil are respectively disposed on N-pole and S-pole portions of the tracking magnet.

41. The optical pickup of claim 40, wherein, when a polarity and an amount of current applied to the tracking coil is altered, a position of the lens holder in the tracking direction is altered.

42. An optical pickup compatible with a high-density recording medium and a low-density recording medium, comprising:
 a first light source to emit a first beam having a wavelength suitable for a high-density recording medium;
 at least one second light source to emit a second beam with a wavelength suitable for a low-density recording medium;
 a first objective lens which focuses the first beam to form an optical spot used to record and/or reproduce data on the high-density recording medium;
 a second objective lens which focuses the second beam to form an optical spot used to record and/or reproduce data on the low-density recording medium; and
 an actuator which includes a lens holder to dispose the first and second objective lenses at different heights when respectively inserted therein, and a magnetic circuit to drive the lens holder, and the first objective lens has a working distance WD1 indicating a distance from the first objective lens to the high-density recording medium at a desired focus, the second objective lens has a working distance WD2 indicating a distance from the second objective lens to the low-density recording medium at a desired focus which is longer than WD1, and the first and second objective lenses are provided so that a distance D between the first objective lens and the high-density recording medium or the low-density recording medium satisfies the following expression:

$D=WD1+\alpha$ and $\alpha=|WD2-WD1|\times(0.1-1.0)$.

43. The optical pickup of claim 42, wherein the lens holder includes first and second installation holes disposed in a radial direction of the recording medium, and the first installation hole, in which the first objective lens is installed, is located closer to an inside diameter of the recording medium than the second installation hole, in which the second objective lens is installed.

44. The optical pickup of claim 42, wherein the magnetic circuit comprises a first magnetic circuit to drive the first and second objective lenses in a focusing direction and s second magnetic circuit to drive the first and second objective lenses in a tracking direction.

45. The optical pickup of claim 44, wherein at least one of the first and second objective lenses is configured so that a type of a wavefront error mainly generated by a tilt of the objective lens is the same as a type of a wavefront error mainly generated by an angle at which light is incident upon the objective lens.

46. The optical pickup of claim 42, wherein at least one of the first and second objective lenses is configured so that the type of a wavefront error mainly generated by a tilt of the objective lens is the same as the type of a wavefront error mainly generated by an angle at which light is incident upon the objective lens.

47. The optical pickup of claim 46, wherein at least one of the first and second objective lenses is configured so that both the wavefront error mainly generated by the tilt of the objective lens and the wavefront error mainly generated by the angle at which light is incident upon the objective lens are coma aberrations.

48. The optical pickup of claim 42, wherein the high-density recording medium is a next-generation DVD which has a higher density than a DVD, and the first light emits a beam in a blue-violet wavelength range suitable for the next-generation DVD.

49. The optical pickup of claim 48, wherein the high-density recording medium has a thickness of about 0.1 mm, and the first objective lens has a numerical aperture of 0.85 or greater.

50. The optical pickup of claim 48, wherein the low-density recording medium is one of a DVD and a CD, and the at least one second light source is provided with at least one of a DVD light source which emits a beam in a red wavelength range suitable for DVDs and a CD light source which emits a beam in an infrared wavelength range suitable for CDs.

51. The optical pickup of claim 50, wherein the second objective lens is configured so that a type of wavefront error mainly generated by a tilt of the second objective lens is the same as a type of wavefront error mainly generated by an angle at which light is incident upon the second objective lens.

52. The optical pickup of claim 51, wherein, when beams emitted from the DVD light source and the CD light source are used, the second objective lens is configured so as to satisfy optical performance criteria for each of the DVD and the CD.

53. The optical pickup of claim 52, wherein, when beams emitted from the DVD light source and CD light source are used, a hologram pattern is formed on the second objective lens so as to satisfy optical performance criteria for each of the DVD and the CD.

54. An optical pickup compatible with a high-density recording medium and a low-density recording medium, comprising:
  a first light source to emit a first beam having a wavelength suitable for a high-density recording medium;
  at least one second light source to emit a second beam having a wavelength suitable for a low-density recording medium;
  a first objective lens having a hih-numeral aperture suitable for the high-density recording medium to focus the first beam to form an optical spot used to record and/or reproduce data on the high-density recording medium;
  a second objective lens to focus the second beam to form an optical spot used to record and/or reproduce data on the low-density recording medium; and
  an actuator which includes a lens holder on which the first and second objective lenses are installed and a magnetic circuit which drives the lens holder,
  wherein the magnetic circuit comprises a first magnetic circuit for driving the first and second objective lenses in a focusing direction and a second magnetic circuit for driving the first and second objective lenses in a tracking direction, and the first objective lens has a working distance WD1 indicating a distance from the first objective lens to the high-density recording medium at a desired focus, the second objective lens has a working distance WD2 indicating a distance from the second objective lens to the low-density recording medium at a desired focus which is longer than WD1, and the first and second objective lenses are provided so that a distance D between the first objective lens and the high-density recording medium or the low-density recording medium satisfies the following expression:

$D=WD1+\alpha$ and $\alpha=|WD2-WD1|\times(0.1-1.0)$.

55. The optical pickup of claim 54, wherein the high-density recording medium is a next-generation DVD which has a higher density than a DVD, and the first light source emits a beam in a blue-violet wavelength range suitable for a next-generation DVD.

56. The optical pickup of claim 55, wherein the high-density recording medium has a thickness of about 0.1 mm, and the first objective lens has a numerical aperture of 0.85 or greater.

57. The optical pickup of claim 55, wherein the low-density recording medium is one of a DVD and a CD, and the second light source is provided with at least one of a DVD light source which emits a beam in a red wavelength range suitable for DVDs and a CD light source which emits a beam in an infrared wavelength range suitable for CDs.

58. The optical pickup of claim 57, wherein the second objective lens is configured so that a type of wavefront error mainly generated by a tilt of the second objective lens is the same as a type of wavefront error mainly generated by an angle at which light is incident upon the second objective lens.

59. The optical pickup of claim 58, wherein the second objective lens is configured so that both the wavefront error mainly generated by the tilt of the second objective lens and the wavefront error mainly generated by the angle at which light is incident upon the second objective lens are coma aberrations.

60. The optical pickup of claim 58, wherein when beams emitted from the DVD light source and the CD light source are used, the second objective lens is configured so as to satisfy optical performance criteria for each of the DVD and the CD.

61. The optical pickup of claim 58, wherein when beams emitted from the DVD light source and the CD light source are used, a hologram pattern is formed on the second objective lens so as to satisfy optical performance criteria for each of the DVD and the CD.

62. The optical pickup of claim 54, wherein at least one of the first and second objective lenses is configured so that the type of a wavefront error mainly generated by the tilt of the objective lens is the same as the type of a wavefront error mainly generated by the angle at which light is incident upon the objective lens.

63. The optical pickup of claim 61, wherein at least one of the first and second objective lenses is configured so that both the wavefront error mainly generated by the tilt of the objective lens and the wavefront error mainly generated by an angle at which light is incident upon the objective lens are coma aberrations.

64. An optical pickup having at least one light source and at least two objective lenses, wherein one of the objective lenses is configured so that the type of a wavefront error mainly generated by the tilt of the objective lens is the same as the type of a wavefront error mainly generated due to an angle of an optical axis of light incident upon the objective lens, and a first of the objective lenses has a working distance WD1 indicating a distance from the first objective lens to a recording medium at a desired focus, a second of the objective lenses has a working distance WD2 indicating a distance from the second objective lens to the recording medium at a desired focus which is longer than WD1, and the first and second objective lenses are provided so that a distance D between the first objective lens and the recording medium satisfies the following expression:

$$D = WD1 + \alpha$$

and $\alpha = |WD2 - WD1| \times (0.1 - 1.0)$.

65. The optical pickup of claim 64, wherein the any one of the objective lenses is configured so that both the wavefront error mainly generated by the tilt of the objective lens and the wavefront error mainly generated by an angle at which light is incident upon the objective lens are coma aberrations.

66. The optical pickup of claim 64, wherein the at least one light source is at least one of a first light source to emit a beam in a blue-violet wavelength range suitable for high-density recording media having a higher density than DVDs, a second light source to emit a beam in a red wavelength range suitable for DVDs, and a third light source to emit a beam in an infrared wavelength range suitable for CDs to be usable with at least one of a recording medium of a high-density recording medium, a DVD-family recording medium, and a CD-family recording medium.

67. The optical pickup of claim 66, wherein the one of the objective lenses is formed so as to have a numerical aperture of 0.85 or greater and to process a recording medium having a thickness of about 0.1 mm and a higher density than DVDs.

68. The optical pickup of claim 64, wherein the one of the objective lenses is formed so as to have a numerical aperture of 0.85 or greater and to process a recording medium having a thickness of about 0.1 mm and a higher density than DVDs.

69. The optical pickup of claim 18, wherein the blue-violet wavelength is about 405 nm.

70. The optical pickup of claim 48, wherein the blue-violet wavelength is about 405 nm.

71. The optical pickup of claim 55, wherein the blue-violet wavelength is about 405 nm.

72. The optical pickup of claim 66, wherein the blue-violet wavelength is about 405 nm.

* * * * *

UNITED STATES PATENT AND TRADEMARK OFFICE
CERTIFICATE OF CORRECTION

PATENT NO. : 7,289,417 B2
APPLICATION NO. : 10/653451
DATED : October 30, 2007
INVENTOR(S) : Tae-kyung Kim et al.

It is certified that error appears in the above-identified patent and that said Letters Patent is hereby corrected as shown below:

Column 29, line 39, delete "a".
Column 32, line 5, insert --the-- before "CD".
Column 32, line 17, delete "hih-".
Column 32, line 17, change "numeral" to --numerical--.

Signed and Sealed this

Nineteenth Day of February, 2008

JON W. DUDAS
*Director of the United States Patent and Trademark Office*